US009113425B2

(12) United States Patent
Adachi

(10) Patent No.: US 9,113,425 B2
(45) Date of Patent: Aug. 18, 2015

(54) COMMUNICATION DEVICE, A COMMUNICATION SYSTEM AND A COMMUNICATION CONTROL METHOD

(75) Inventor: Takahiro Adachi, Tokyo (JP)

(73) Assignee: NEC CORPORATION, Tokyo (JP)

(*) Notice: Subject to any disclaimer, the term of this patent is extended or adjusted under 35 U.S.C. 154(b) by 302 days.

(21) Appl. No.: 13/576,901

(22) PCT Filed: Mar. 15, 2011

(86) PCT No.: PCT/JP2011/056697
§ 371 (c)(1),
(2), (4) Date: Aug. 2, 2012

(87) PCT Pub. No.: WO2011/118546
PCT Pub. Date: Sep. 29, 2011

(65) Prior Publication Data
US 2013/0003806 A1 Jan. 3, 2013

(30) Foreign Application Priority Data
Mar. 24, 2010 (JP) .................................. 2010-067922

(51) Int. Cl.
H04L 27/00 (2006.01)
H04W 52/26 (2009.01)
H04W 24/00 (2009.01)

(52) U.S. Cl.
CPC ......... *H04W 52/262* (2013.01); *H04L 27/0008* (2013.01); *H04L 27/0012* (2013.01); *H04W 24/00* (2013.01)

(58) Field of Classification Search
CPC  H04W 24/00; H04L 27/0012; H04L 27/0008
USPC .......................................... 375/219, 295, 316
See application file for complete search history.

(56) References Cited

U.S. PATENT DOCUMENTS

2002/0058505 A1  5/2002  Kim et al.
2005/0185727 A1*  8/2005  Tanaka et al. ................. 375/261

(Continued)

FOREIGN PATENT DOCUMENTS

EP  2023509 A1  2/2009
JP  H00983600 A  3/1997

(Continued)

OTHER PUBLICATIONS

The international search report for PCT/JP2011/056697, dated Jun. 21, 2011.

(Continued)

Primary Examiner — Freshteh N Aghdam
(74) Attorney, Agent, or Firm — Sughrue Mion, PLLC

(57) ABSTRACT

Provided is a communication device which can handle variation in transmission power accompanying switching of a modulation system.

Included are: a receiving unit which receives a signal for which modulation according to a modulation system including a first modulation system and a second modulation system is performed based on modulation system designation information by an external transmission device, demodulates the received signal based on modulation system control information, and outputs the received data; a reception level measurement unit which measures a signal level of the signal, and outputs a reception level; an information extracting unit which outputs the modulation system control information based on the received data; a designation information output unit which outputs the modulation system designation information according to a modulation system switching threshold which was set based on a transmission power variation width which is a variation width when transmission power at a time when the signal is transmitted by the transmission device varies before and after switching of the modulation system between the first modulation system and the second modulation system by the transmission device; and a transmission unit which transmits the modulation system designation information to the transmission device.

13 Claims, 25 Drawing Sheets

(56) References Cited

U.S. PATENT DOCUMENTS

| | | | |
|---|---|---|---|
| 2008/0032726 A1* | 2/2008 | Tajima et al. | 455/509 |
| 2009/0046693 A1* | 2/2009 | Nory et al. | 370/343 |
| 2009/0296852 A1* | 12/2009 | Kobayashi | 375/295 |
| 2009/0305735 A1 | 12/2009 | Sasaki et al. | |
| 2010/0297949 A1* | 11/2010 | Nakajima | 455/63.1 |

FOREIGN PATENT DOCUMENTS

| | | |
|---|---|---|
| JP | 1998041876 A | 2/1998 |
| JP | 2002077280 A | 3/2002 |
| JP | 2002199038 A | 7/2002 |
| JP | 2006041959 A | 2/2006 |
| JP | 2009177459 A | 8/2009 |
| WO | 2007138796 A1 | 12/2007 |

OTHER PUBLICATIONS

Form ISA 237 for PCT/JP2011/056697 (English translation).
EP search report in corresponding EP patent application 11759351.7-1855/2552069 PCT/JP2011056697, dated May 22, 2015.

* cited by examiner

Fig.3

| RECEPTION LEVEL | WHEN CURRENT MODULATION SYSTEM IS I | WHEN CURRENT MODULATION SYSTEM IS II |
|---|---|---|
| x < FIRST SWITCHING THRESHOLD | I | I |
| FIRST SWITCHING THRESHOLD ≦ x < SECOND SWITCHING THRESHOLD | I | II |
| SECOND SWITCHING THRESHOLD ≦ x | II | II |

Fig.22

| RECEPTION LEVEL | WHEN CURRENT MODULATION SYSTEM IS I | WHEN CURRENT MODULATION SYSTEM IS II |
|---|---|---|
| x < FIRST SWITCHING THRESHOLD | I | I |
| FIRST SWITCHING THRESHOLD ≦ x < SECOND SWITCHING THRESHOLD | I | II |
| SECOND SWITCHING THRESHOLD ≦ x | II | II |

COMMUNICATION DEVICE, A COMMUNICATION SYSTEM AND A COMMUNICATION CONTROL METHOD

TECHNICAL FIELD

The present invention relates to a communication device, a communication system and a communication control method and in particular, relates to a communication device, a communication system and a communication control method capable of stable switching of a modulation system.

BACKGROUND ART

A digital microwave communication system has a merit compared with a wired circuit such as an optical fiber that it is inexpensive and construction in a short period is possible. For this reason, in recent years, the digital microwave communication system is popularly employed as a backhaul circuit in a mobile network. And by development of mobile broadband communication represented by an LTE (Long Term Evolution) and a mobile WiMAX (Worldwide Interoperability for Microwave Access), further capacity increase is required for the backhaul circuit.

Generally, for the digital microwave communication system, circuit design is performed according to the standard specified by such as G.826 standardized by ITU-T (International Telecommunication Union—Telecommunication Standardization Sector). Therefore, the digital microwave communication system is operated in most cases throughout a year in a state that has enough margins for circuit quality. In recent years, in order to improve utilization efficiencies and availabilities of the circuit further, an adaptive modulation system which varies a modulation system according to a state of the propagation line adaptively is becoming to be used (for example, refer to patent document 1).

In an adaptive modulation system disclosed in patent document 1, at receiving side, an appropriate modulation system is selected using such as received signal level and error rate information of a demodulated signal, and the selected result is transmitted to an opposite station side. On the opposite station side, a transmission modulation system is switched following the selected result. For example, in case propagation line state of a radio wave is good, a modulation system with higher transmission rate is applied. Accordingly, compared with a system of a conventional fixed modulation system, communication capacity can be increased. Conversely, in case propagation line state is deteriorated, a modulation system which is applicable to the environment, for example, a modulation system with a small modulation multi-valued number is applied. Accordingly, because circuit disconnection can be prevented, circuit operating ratio can be improved.

Adaptive modulation control which controls a modulation system and transmission power of an opposite station also exists (for example, refer to patent document 2). In an adaptive modulation system disclosed in patent document 2, change in the modulation system and the transmission power is requested to the opposite side device based on a difference between a current reception level and a required reception level set in advance.

PRECEDING TECHNICAL DOCUMENT

Patent document

[Patent document 1] JP 1998-41876 A (pp. 4-5, FIG. 1).
[Patent document 2] WO2007/138796 pamphlet (pp. 9-13, FIGS. 2-4)

SUMMARY OF INVENTION

Technical Problem

Tolerance of each modulation system for a skew is different. For example, there is a case that a number of levels (hereinafter, referred to as "a multi-valued number") of a state set by modulation is different for each modulation system. "The state" means amplitude, a phase or a frequency of a signal generated by modulation (hereinafter, referred to as "a modulated signal"). Since the larger the multi-valued number is, the smaller a difference between the states is between modulated signals for which different states are set, the modulated signals tend to undergo influences of a skew.

That the difference between the states set by modulation is small is also expressed as "interval of signal points is small". The signal point is, for example, one which plotted amplitude and a phase set by modulation as a point on a plane. The multi-valued number is equal to a number of the signal points. And since a range that the amplitude and the phase can be set is limited, a range where the signal point can be arranged is also limited. Accordingly, the larger the multi-valued number is, the smaller the interval of the signal points becomes.

At the moment when a waveform of a modulated signal is skewed, from appearances, same influences appear as at time when amplitude, a phase or both of them of the signal varied. Accordingly, in case the modulated signal has a skew, in a modulation system with small signal point interval, possibility that a receiving side judges mistakenly the signal point of the modulated signal as another signal point is high. Accordingly, the larger the multi-valued number is, the more a waveform of a modulated signal tends to undergo influences of a skew. Since this is well-known for a person skilled in the art, further description will be omitted.

For example, the multi-valued numbers of QPSK (Quadrature Phase Shift Keying) and 256QAM (Quadrature Amplitude Modulation) are 4 and 256, respectively. In a system which modulates amplitude and a phase such as PSK and QAM, the larger the multi-valued number is, the smaller the difference between the amplitude and the phase between modulated signals is, and the weaker for a skew.

On the other hand, a skew of a modulated signal becomes larger as transmission power becomes larger. This is because, in an area with large amplitude, linearity of an amplifier declines.

Therefore, depending on an applied modulation system, there is a case that maximum transmission power is restricted. There are cases, for example, such as 25 dBm for QPSK and 15 dBm for 256QAM, that the larger the multi-valued number is, the lower the maximum transmission power may be set.

Accordingly, in an adaptive modulation system, when a transmission side switches a modulation system, transmission power may also be varied simultaneously.

On the other hand, at a receiving side, there is a case that a signal level of a received signal is detected, and switching of a modulation system is requested to the transmission side.

In the technologies described in patent documents 1 and 2, although a signal level of a received signal is detected, and switching of a modulation system is requested to a transmission side, switching of transmission power accompanying the switching of the modulation system on the transmission side is not considered. Therefore, there is a problem that they cannot handle a case that switching of the modulation system on the transmission side occurs and transmission power varies accompanying that as a result of the request of switching of the modulation system to the transmission side from the receiving side.

Objects of the Invention

The present invention is made in view of the above-mentioned technical problem, and the object is to provide a communication device, a communication system and a communication control method which are capable of handling of variation in transmission power accompanying a modulation system.

Solution to Problem

A communication device of the present invention includes: a receiving unit which receives a signal for which modulation according to a modulation system including a first modulation system and a second modulation system is performed based on modulation system designation information by an external transmission device, demodulates the received signal based on modulation system control information, and outputs the received data; a reception level measurement unit which measures a signal level of the signal, and outputs a reception level; an information extracting unit which outputs the modulation system control information based on the received data; a designation information output unit which outputs the modulation system designation information according to a modulation system switching threshold which was set based on a transmission power variation width which is a variation width when transmission power at a time when the signal is transmitted by the transmission device varies before and after switching of the modulation system between the first modulation system and the second modulation system by the transmission device; and a transmission unit which transmits the modulation system designation information to the transmission device.

A communication system of the present invention includes: a first communication device which performs modulation according to a modulation system capable of switching and transmits a signal; and a second communication device which requests the switching to the first communication device according to a modulation system switching threshold which was set based on a transmission power variation width which is a variation width when transmission power at a time when the signal is transmitted by the first communication device varies accompanying the switching.

A communication control method of the present invention includes: a step which requests, according to a modulation system switching threshold which was set based on a transmission power variation width which is a variation width of transmission power accompanying switching of a modulation system on a transmission side, switching of the modulation system to the transmission side.

Or, the communication control method of the present invention includes: a step which switches a modulation system adaptively and transmits a signal; a step in which transmission power of the signal varies accompanying the switching of the modulation system; a step which sets a threshold for switching the modulation system based on a width by which the transmission power varies; and a step which decides the modulation system when transmitting the signal based on the threshold.

Advantageous Effects of Invention

In a communication device, a communication system and a communication control method of the present invention, there is an effect that handling of variation in transmission power accompanying switching of a modulation system is possible.

BRIEF DESCRIPTION OF DRAWINGS

[FIG. 3] is a correspondence table of a reception level and a judgment result of a modulation system applied next in an adaptive modulation system of the first exemplary embodiment of the present invention.

[FIG. 22] is an example of a correspondence table of a reception level and a judgment result of a modulation system applied next in an adaptive modulation system in which hysteresis control handling variation in transmission power accompanying switching of a modulation system is not performed.

DESCRIPTION OF EMBODIMENTS (The First Exemplary Embodiment)

First, a problem will be described in detail which can occur in case, as a result of a request of switching of a modulation system to a transmission side from a receiving side, switching of the modulation system on the transmission side occurs and transmission power varies accompanying that.

Figure 19:
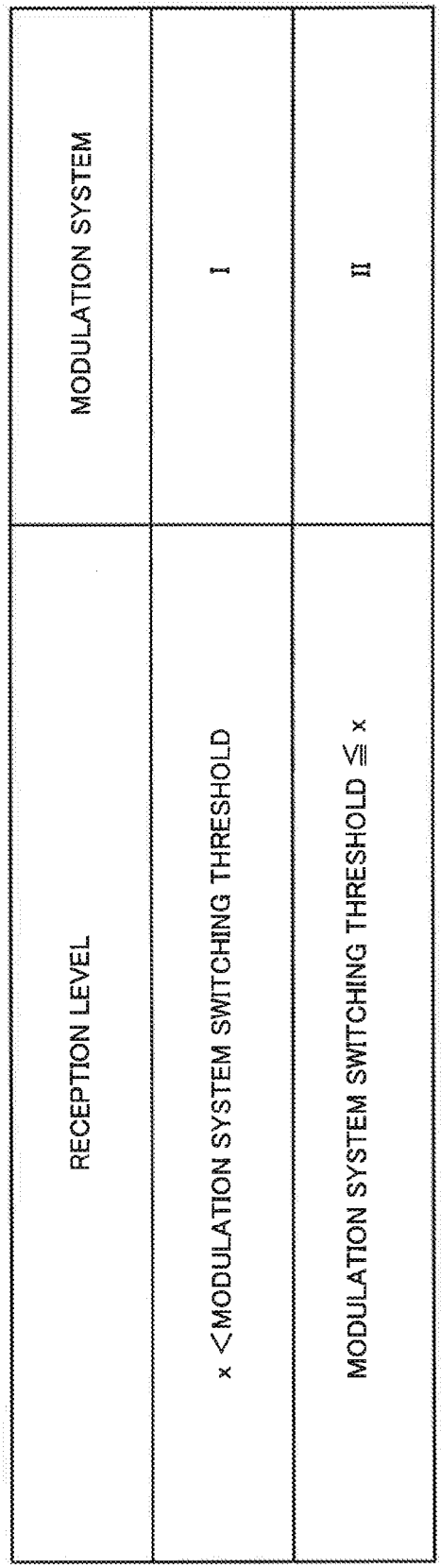
[FIG. 19] is an example of a correspondence table of a reception level and a modulation system in an adaptive modulation system which does not handle variation in transmission power accompanying switching of a modulation system.
Figure 20:
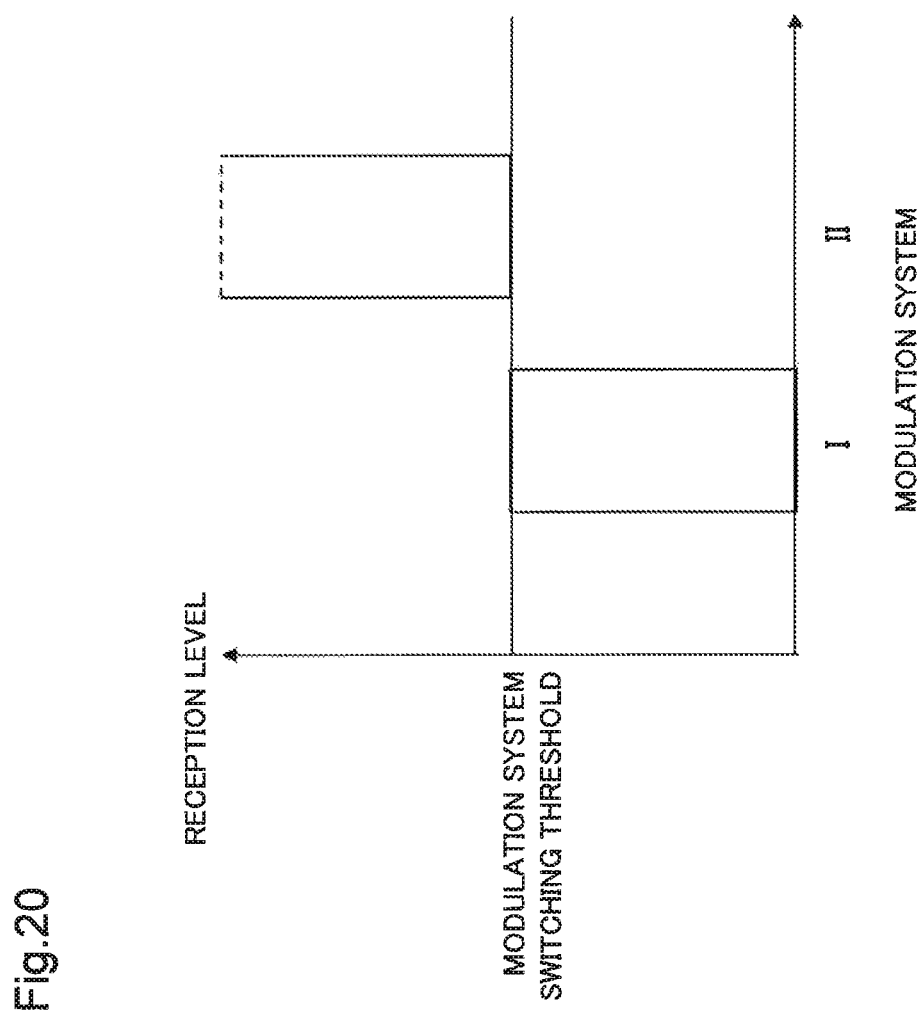
[FIG. 20] is a graph showing correspondence of a reception level and a modulation system in the adaptive modulation system of FIG. 19.
Figure 21:
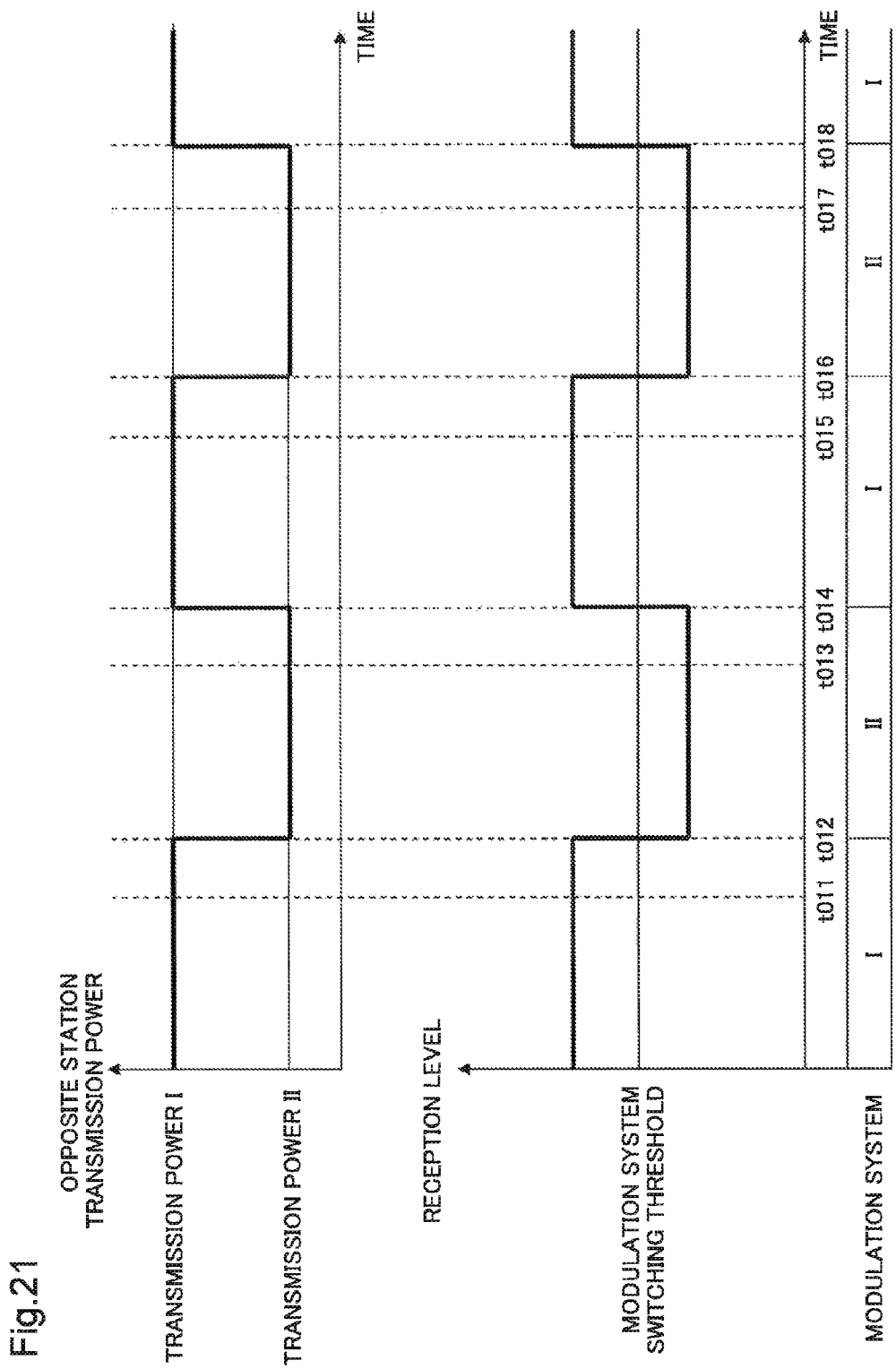
[FIG. 21] is a graph showing an example of operation of an adaptive modulation system in the adaptive modulation system of FIG. 19.

FIG. 19 is a correspondence table of a reception level and a modulation system in an adaptive modulation system (hereinafter, referred to as "an adaptive modulation system with no handling of transmission power variation") which does not handle variation of the transmission power accompanying the switching of the modulation system. FIG. 20 is a graph showing correspondence of a reception level and a modulation system in an adaptive modulation control with no handling of transmission power variation. FIG. 21 is a graph showing an example of a reception level with changes of time, and variation of applied modulation systems and transmission power of a transmission device in the adaptive modulation control with no handling of transmission power variation.

As shown in FIGS. 19 and 20, in the adaptive modulation system, a modulation system applied is specified corresponding to a range of the reception level. A communication device on the receiving side of a signal (hereinafter, referred to as "a local station") requests, according to the reception level, change of a modulation system applied to a communication device of the transmission side of the signal (hereinafter, referred to as "an opposite station"). Even when the same modulation system is applied, depending on the reception level, BER (Bit Error Rate: bit error rate) differs. On the other hand, when at the same reception level, there is a possibility that other modulation system can secure lower BER. Accordingly, basic idea of the adaptive modulation system is, when the reception level declines and BER becomes no smaller than a certain value, to switch to a modulation system for which lower BER can be secured even at the reception level. In the examples of FIGS. 19 and 20, there are two kinds of modulation systems and when the reception level is low, a first modulation system (hereinafter, described as "a modulation system I"), and when it is high, a second modulation system (hereinafter, described as "a modulation system II") will be applied. The reception level which becomes a boundary when the modulation system I and the modulation system II are switched will be called hereinafter as "a modulation system switching threshold".

An example of operation when the adaptive modulation shown in FIGS. 19 and 20 is performed will be described specifically with reference to FIG. 21.

Because a maximum transmission power on the opposite station is different depending on the modulation system, there is a case that the transmission power may vary accompanying the switching of the modulation system. A value of the maximum transmission power of the modulation system I (hereinafter, referred to as "a first maximum transmission power") is set as "transmission power I", and a value of the maximum transmission power of the modulation system II (hereinafter, referred to as "a second maximum transmission power") is set as "transmission power II". At this time, it is supposed that the transmission power I is larger than the transmission power II. Difference between the transmission power I and the transmission power II will be called hereinafter as "a transmission power variation width".

It is supposed that a state of a transmission line is stable. That is, it is supposed that a modulated signal transmitted from the opposite station is attenuated for a certain fixed amount and reaches the local station.

In an initial state, it is supposed that the modulation system I is applied as the modulation system, and the reception level is higher than the modulation system switching threshold. At this time, after a predetermined waiting time has passed (time t011), the local station requests the opposite station to switch the modulation system to the modulation system II.

Further, length of "the waiting time" spent in order to determine whether the reception level is over or below the modulation system switching threshold is arbitrary. While responsiveness to a change of the modulation system gets better when the waiting time is short, frequency of occurrences of the problem described below also becomes high. On the other hand, although the responsiveness to the change of the modulation system becomes worse when the waiting time is long, the frequency of occurrences of the problem described below becomes low. In any event, there are no cases that no problem occurs depending on the length the waiting time.

The opposite station which received the request changes the modulation system to the modulation system II (time t012). And the opposite station lowers the transmission power to the transmission power II.

When the opposite station lowers the transmission power to the transmission power II, the reception level of the local station also declines and it becomes lower than the modulation system switching threshold. Therefore, after the waiting time has passed (time t013), the local station requests the opposite station to change the modulation system to the modulation system I.

The opposite station which received the request changes the modulation system to the modulation system I (time t014). And the opposite station raises the transmission power to the transmission power II.

When the opposite station raises the transmission power to the transmission power II, the reception level of the local station also rises and it becomes higher than the modulation system switching threshold. Therefore, after the waiting time has passed (time t015), the local station requests the opposite station to change the modulation system to the modulation system II.

The opposite station which received the request changes the modulation system to the modulation system II (time t016). And the opposite station lowers the transmission power to the transmission power I.

After that, at time t017, the local station requests change of the modulation system of the opposite station, and the opposite station changes the modulation system at time t018.

Thus, even though the state of the transmission line is stable, the modulation system is changed successively. Accordingly, a problem that an applied modulation system is not stable occurs.

Incidentally, the state of the transmission line is generally unstable since it undergoes influences of various environments such as natural conditions. Therefore, even if the transmission power of the transmission device is stable, the reception level may fluctuate irregularly. While the reception level fluctuates irregularly, if the modulation system is switched based on the reception level, there is a possibility that the modulation system may frequently be changed within a short period. In order to handle such a problem, a hysteresis control may be introduced to the switching of the modulation system based on the reception level. That the problem mentioned above occurs similarly to the adaptive modulation system with no handling of transmission power variation even in case such hysteresis control is performed will be explained below.

FIG. 22 is a correspondence table of a reception level and a judgment result of the modulation system applied next when the hysteresis control handling fluctuation of the transmission line state is performed in the adaptive modulation system with no handling of transmission power variation. As shown in FIG. 22, as the modulation system switching threshold, two levels of threshold of "a first modulation system switching threshold" and "a second modulation system switching threshold" are set. A value of the first modulation system switching threshold is referred to as "a modulation system switching threshold I", and a value of the first modulation system switching threshold is referred to as "a modulation system switching threshold II". Further, in the correspondence table of FIG. 22, "the modulation system switching threshold" is abbreviated simply as "a switching threshold".

The hysteresis control based on the current modulation system is introduced for a judgment of the modulation system to be applied. The judgment of the modulation system to be applied is specifically performed as follows. In case the reception level is less than the modulation system switching threshold I, the judgment result of the modulation system to be applied next will always be the modulation system I. In case the reception level is no smaller than the modulation system switching threshold II, the judgment result of the modulation system to be applied next will always be the modulation system II. However, in case the reception level is no smaller than the modulation system switching threshold I and is less than the modulation system switching threshold II, depending on which of the modulation system I or the modulation system II the current modulation system is, the judgment result of the modulation system to be applied next is different. That is, in case the reception level is within the range mentioned above, if the current modulation system is the modulation system I, the modulation system applied next is also the modulation system I, and if the current modulation system is the modulation system II, the modulation system applied next will also be the modulation system II.

Figure 23:
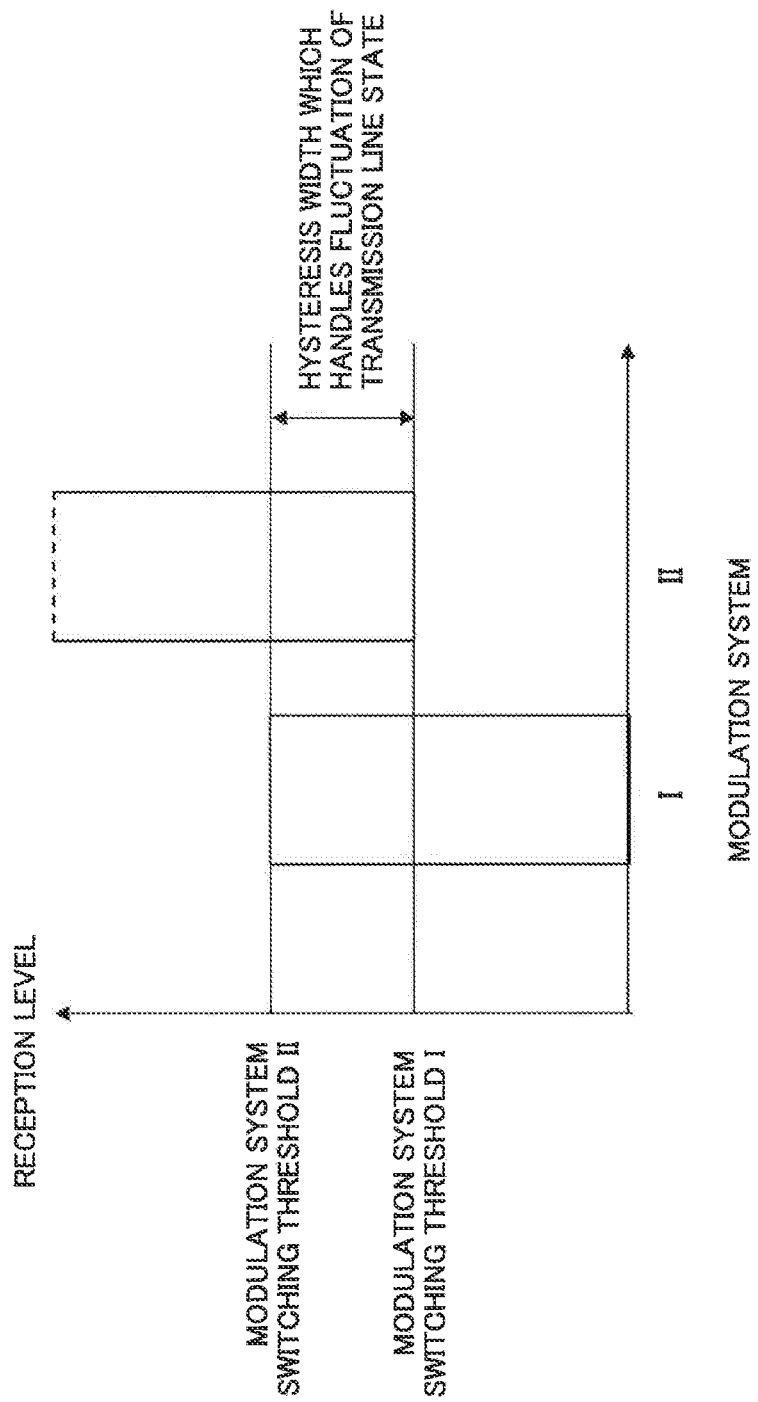
[FIG. 23] is a graph showing correspondence of a reception level and a modulation system in the adaptive modulation system of FIG. 22.
Figure 24:
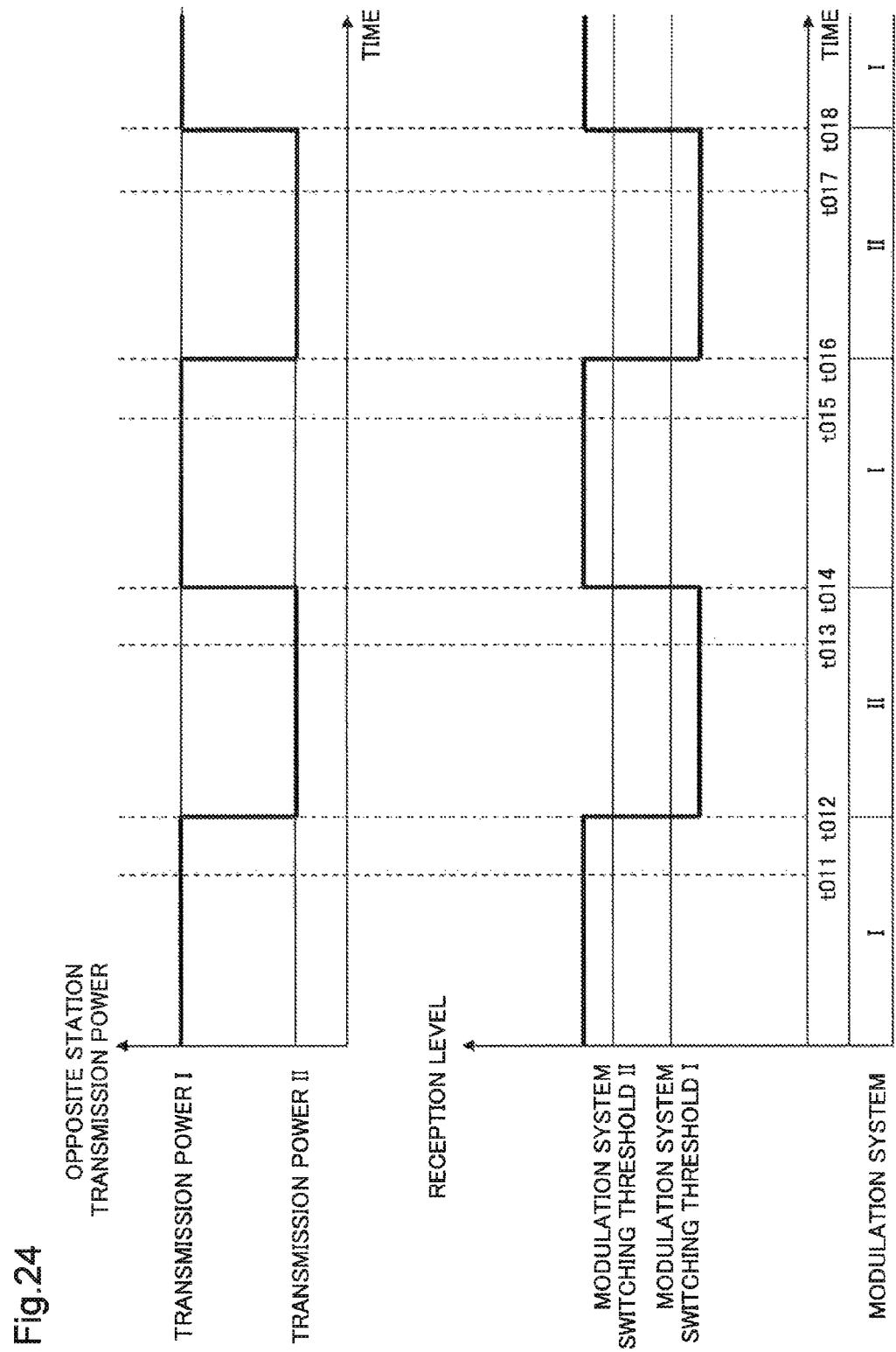
[FIG. 24] is a graph showing an example of operation of an adaptive modulation system in the adaptive modulation system of FIG. 22.
Figure 25:
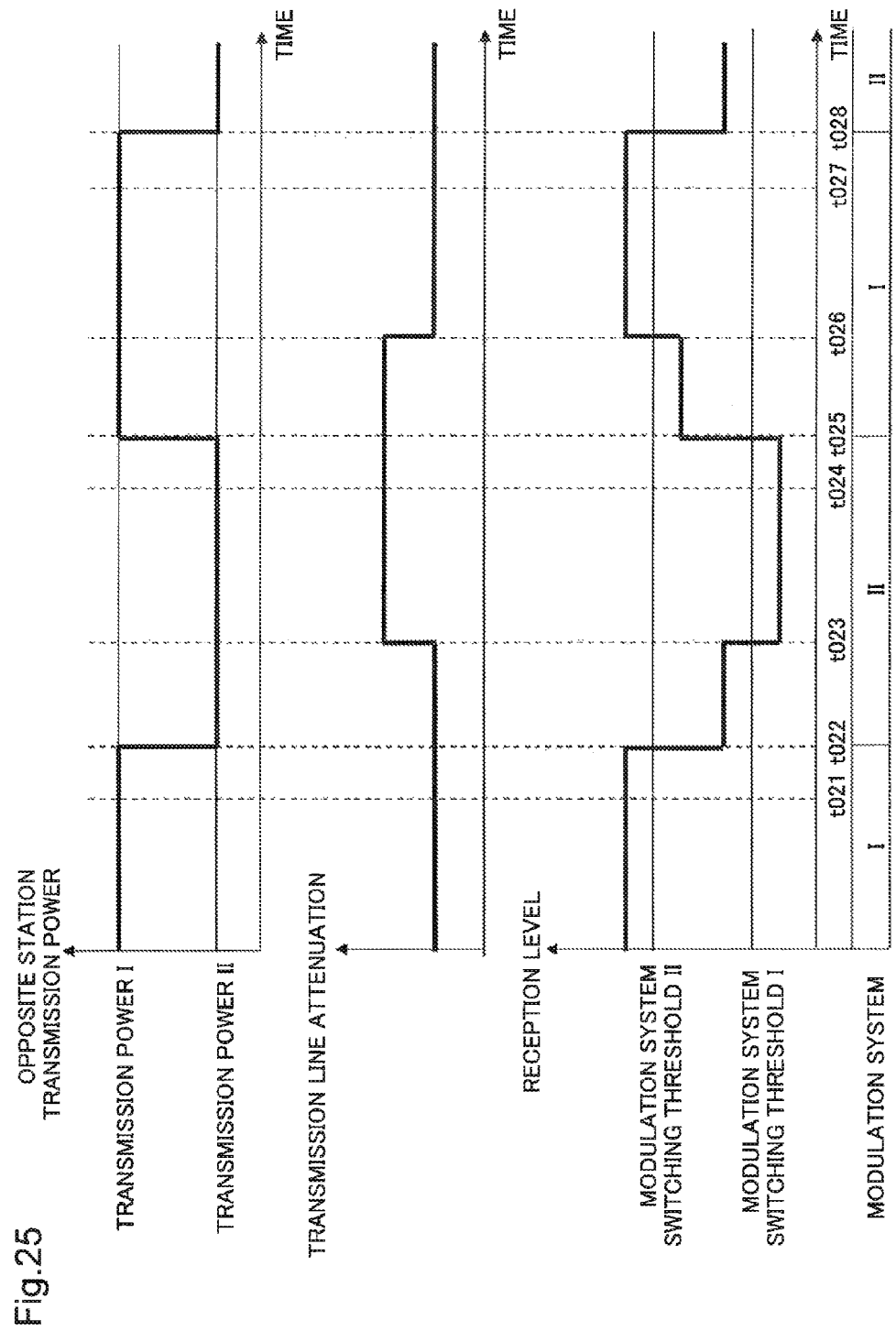
[FIG. 25] is a graph showing another example of operation of an adaptive modulation system in the adaptive modulation system of FIG. 22.

FIG. 23 is a graph showing correspondence of the reception level and the modulation system when the hysteresis control is performed in the adaptive modulation control with no handling of transmission power variation. FIGS. 24 and 25 are graphs showing an example of the reception level with changes of time and, the variation of the applied modulation systems and the transmission power of the transmission device when the hysteresis control handling fluctuation of the transmission line state is performed in the adaptive modulation control with no handling of transmission power variation.

In FIG. 24 and FIG. 25, differences between the modulation system switching threshold I and the second modulation system switching threshold, that is, the hysteresis width, are different. In FIG. 24, the hysteresis width is smaller than the difference between the transmission power I and the transmission power II. Therefore, similar to a case of FIG. 21, the problem of successive occurrences of switching of the modulation system by the variation in the reception level caused by the variation of the transmission power occurs. That is, occurrence of this problem cannot be prevented by the hysteresis control which does not handle the transmission power variation.

In FIG. 25, the hysteresis width is larger than the difference between the transmission power I and the transmission power II. Therefore, when the state of the transmission line does not vary, successive occurrences of switching of the modulation system can be prevented by the effect of the hysteresis. However, when the state of the transmission line varies and attenuation varies, the problem occurs. Below, it will be explained that the problem occurs.

In the initial state, since the reception level is higher than the modulation system switching threshold II, after the waiting time has passed (time t021), the local station requests the opposite station to change the modulation system to the modulation system II.

The opposite station which received the request changes the modulation system to the modulation system II (time t022). And the opposite station lowers the transmission power to the transmission power II.

Although the reception level of the local station also declines when the opposite station lowers the transmission power to the transmission power II, since the reception level is between the modulation system switching threshold I and the modulation system switching threshold II, the change request of the modulation system by the local station does not occur.

Here, when the attenuation of the transmission line increases (time t023), the reception level of the local station declines and it becomes less than the modulation system switching threshold I. Therefore, after the waiting time has passed (time t024), the local station requests the opposite station to change the modulation system to the modulation system I.

The opposite station which received the request changes the modulation system to the modulation system I (time t025). And the opposite station raises the transmission power to the transmission power I.

Although the reception level of the local station also rises when the opposite station raises the transmission power to the transmission power I, since the reception level is between the modulation system switching threshold I and the modulation system switching threshold II, the change request of the modulation system by the local station does not occur.

Here, when the attenuation of the transmission line declines (time t026), the reception level of the local station rises and it becomes higher than the modulation system switching threshold II. Therefore, after the waiting time has passed (time t027), the local station requests the opposite station to change the modulation system to the modulation system II.

The opposite station which received the request changes the modulation system to the modulation system I (time t028). And the opposite station lowers the transmission power to the transmission power I.

As described above, though the hysteresis width is larger than the variation width of the attenuation of the transmission line, the modulation system varies accompanying the variation of the attenuation of the transmission line. Thus, even for the variation of the state of the transmission line within a degree which should be originally absorbed, the effect of the hysteresis control can not be obtained. The reason is because the hysteresis width is smaller than a sum of the transmission power variation width and a variation width of the attenuation of the transmission line.

Further, in the description above, a case was used in which the maximum transmission power is different depending on the modulation system as an example. The problem relating to the variation of the transmission power accompanying the switching of the modulation system can occur in general not only in case the maximum transmission power is different depending on the modulation system but also in case the transmission power varies accompanying the switching of the modulation system. For example, even in the state that the state of the transmission line is very good, and the opposite station is transmitting with minimum electric power, when the reception level becomes less than the modulation system switching threshold temporarily, the modulation system will be switched. At this time, when the transmission power is raised by the opposite station, switching to the original modulation system occurs again. Thus, successive switching of the modulation system mentioned above is a problem which can occur in general to a system in which a switching request of the modulation system based on the reception level and switching of the modulation system and change of the transmission power based on the request are performed. Also, there is a system in which the modulation system is switched, and predetermined different transmission power is set in advance for each modulation system. In such a case, there is a possibility that the problem mentioned above may also occur.

As described above, it is understood that, in the adaptive modulation system which varies the transmission power depending on the modulation system, the control considering the variation of the transmission power should be performed. Accordingly, in the present invention, the hysteresis control considering the variation of the transmission power is introduced in the adaptive modulation system.

Figure 1:
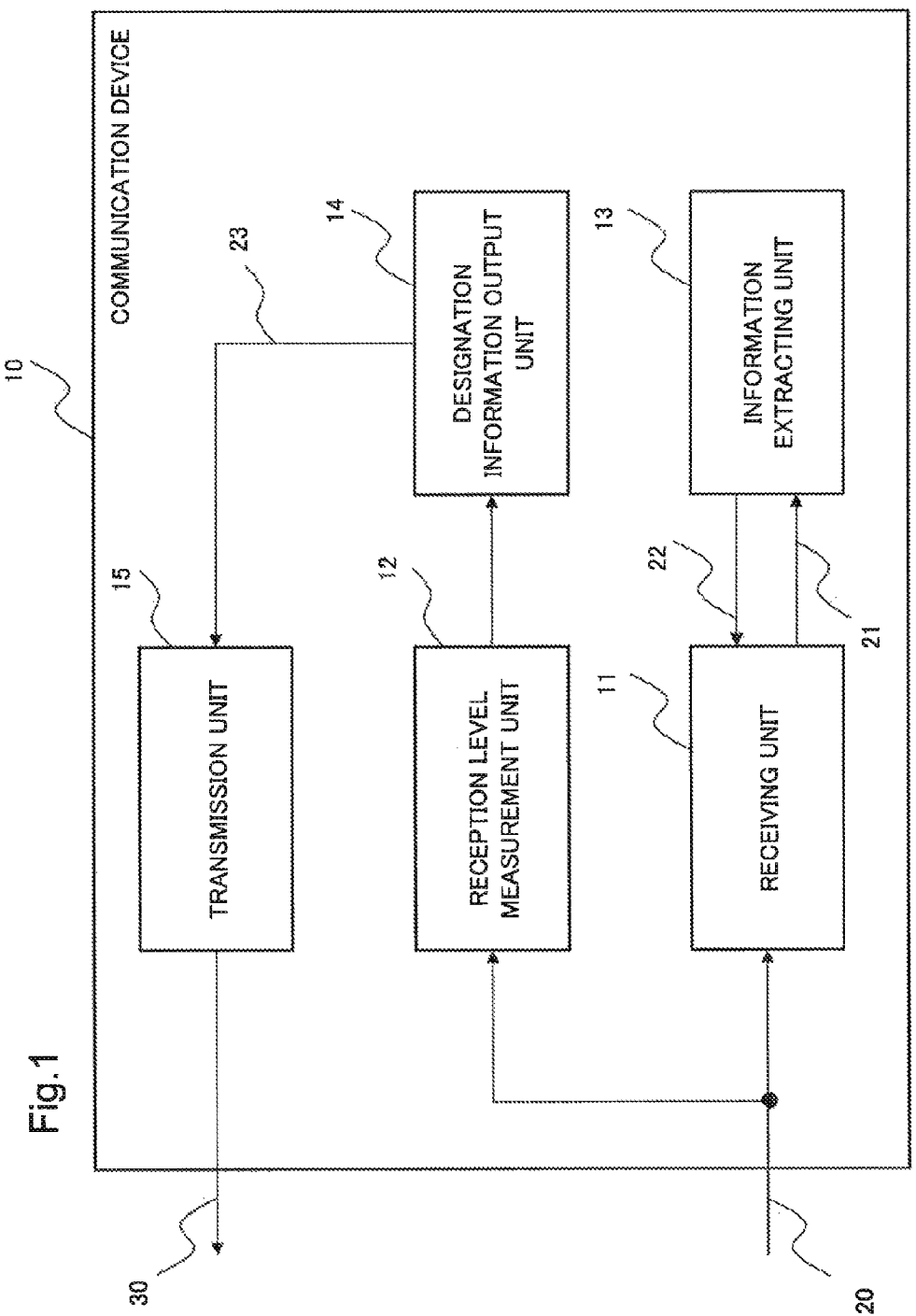
[FIG. 1] is a block diagram showing a structure of a communication device of the first exemplary embodiment of the present invention.
Figure 2:
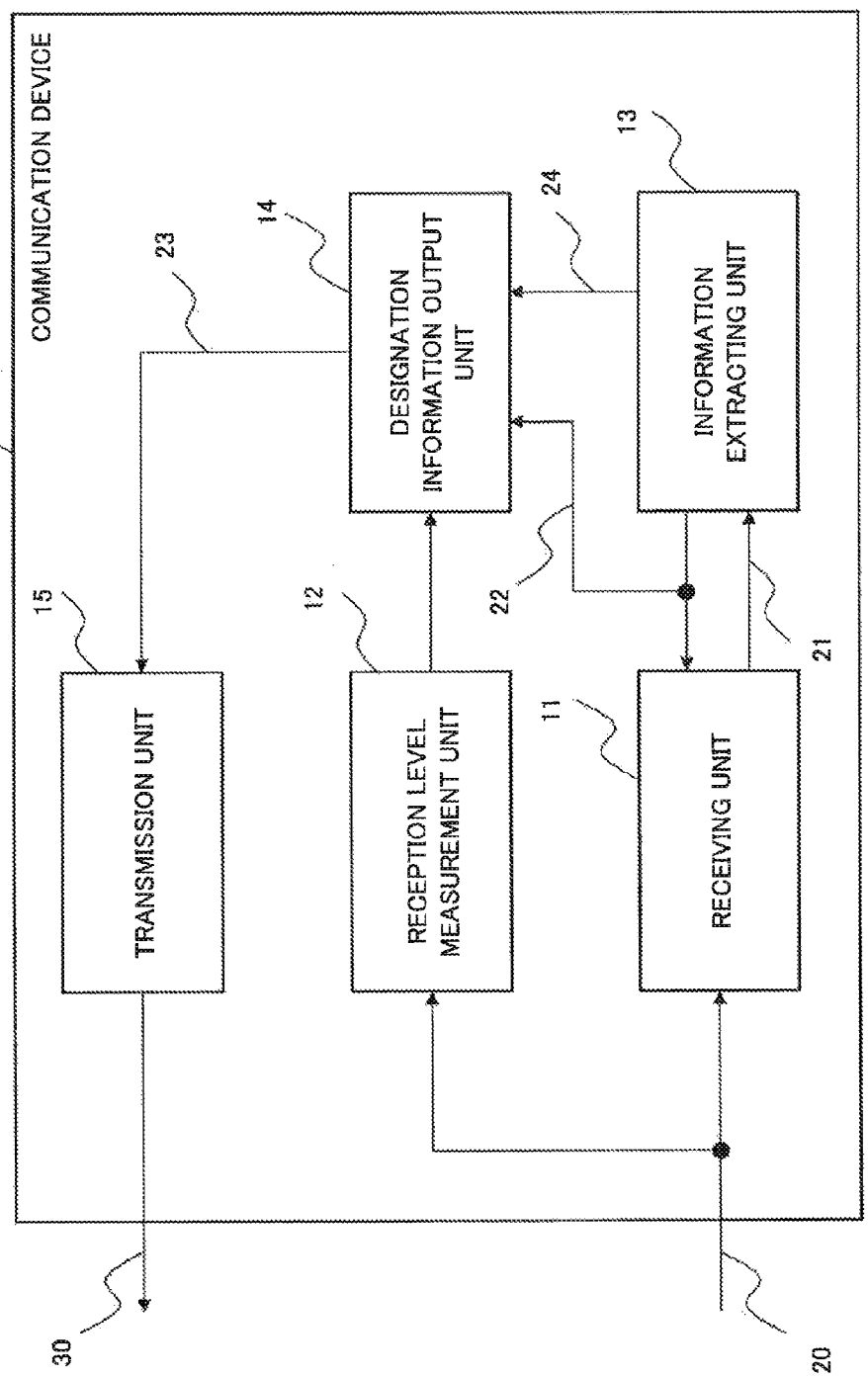
[FIG. 2] is a block diagram showing a structure of a modified example of a communication device of the first exemplary embodiment of the present invention.
Figure 4:
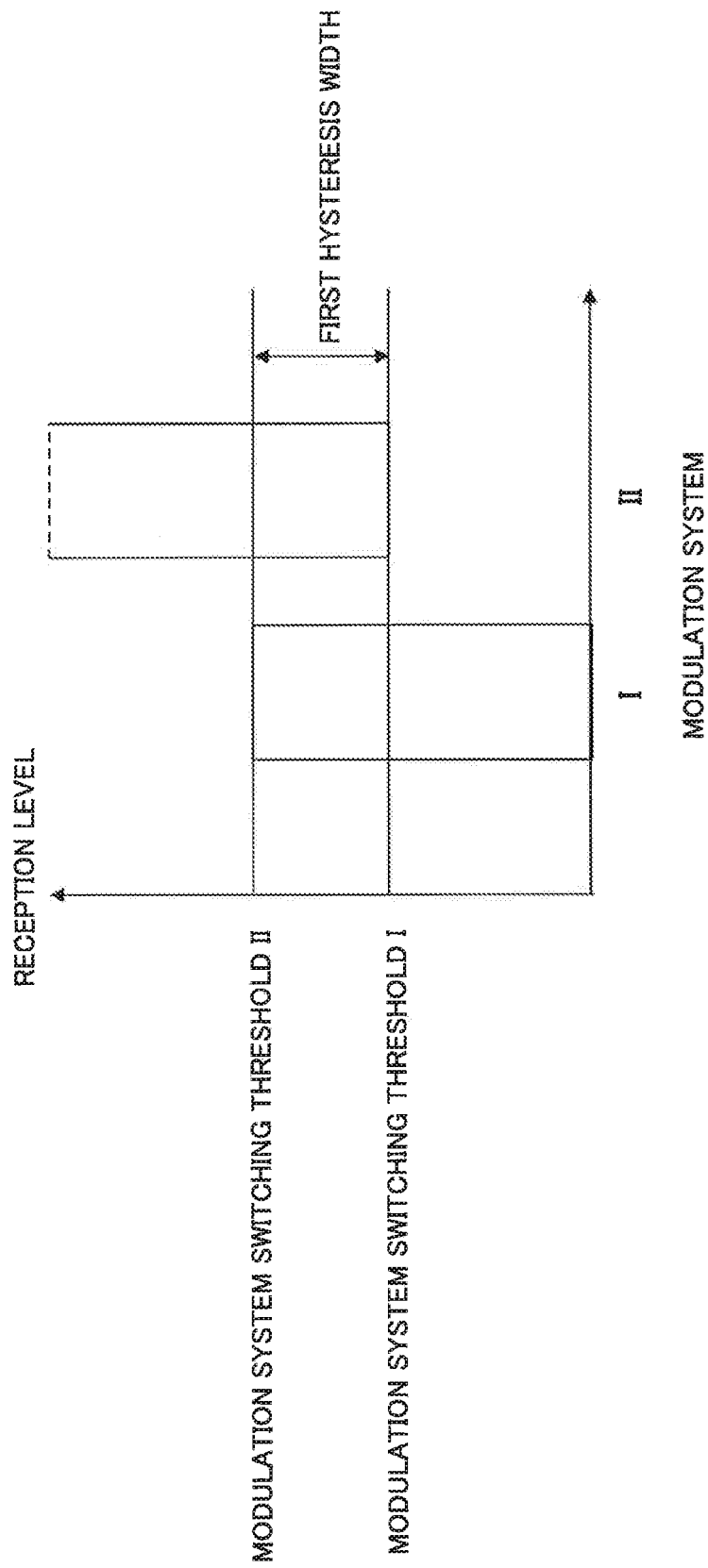
[FIG. 4] is a graph showing correspondence of a reception level and a modulation system in an adaptive modulation system of the first exemplary embodiment of the present invention.

The first exemplary embodiment of the present invention will be described in detail with reference to drawings. The first exemplary embodiment is an exemplary embodiment in an ideal state which does not need to consider fluctuation of the state of the transmission line. FIG. 1 is a block diagram showing a structure of a communication device of the first exemplary embodiment. FIG. 2 is a block diagram showing a structure of a modified example of a communication device of the first exemplary embodiment. FIG. 3 is a correspondence table of the reception level and the judgment result of the modulation system applied next in an adaptive modulation system of the first exemplary embodiment. FIG. 4 is a graph showing correspondence of the reception level and the judgment result of the modulation system applied next in the adaptive modulation control of the first exemplary embodiment. FIG. 5, FIG. 6, FIG. 7 and FIG. 8 are graphs showing the reception level change with time and variation of the modulation system applied and the transmission power of the transmission device when the adaptive modulation control is performed in the first exemplary embodiment.

The configuration of the communication device of the first exemplary embodiment will be described with reference to FIG. 1. A communication device 10 of the first exemplary embodiment includes a receiving unit 11, a reception level measurement unit 12, an information extracting unit 13, a designation information output unit 14 and a transmission unit 15.

The receiving unit 11 receives a received signal 20, demodulates the received signal 20 and outputs a received data 21. The received signal 20 is a signal transmitted by an external transmission device (not illustrated). The received signal 20 is a modulated signal modulated with a modulation system designated by modulation system designation information 23 described below by the transmission device.

The reception level measurement unit 12 measures a signal level of the received signal 20. The signal level is a value which indicates strength of the signal such as amplitude and electric power of the received signal 20. Measurement of the reception level can be done by various methods. Since the measurement method of the reception level is not a substantial part of the present invention, the detailed description will be omitted.

The information extracting unit 13 extracts, based on modulation system control information which the transmission device transmitted included in the received data 21, modulation system control information 22 which indicates the modulation system applied to the received signal 20. The modulation system extracted at this time is a modulation system applied to the received signal 20 next. The modulation system which is applied to the received signal 20 which is being received at present is determined based on the modulation system control information 22 which is included in the received signal 20 received last. In other words, the transmission device includes in the received signal 20 which is being transmitted the modulation system which is applied to the received signal 20 transmitted next as the modulation system control information 22, and transmits. Thus, the received signal 20 is a series of signals with limited length called a frame, a packet and so on. Accordingly, when the received signal 20 is transmitted pluralities of times, pluralities of the received signals 20 transmitted can be identified. Further, the modulation system in the initial state before the received signal 20 is received may be set to a predetermined system in advance.

The designation information output unit 14 outputs the modulation system designation information 23 based on the reception level measured by the reception level measurement unit 12. The modulation system designation information 23 is information which designates the modulation system which is applied when the transmission device transmits the received signal 20. Further, whole function of the designation information output unit 14 may be taken in the transmission unit 15 described below.

The transmission unit 15 transmits the modulation system designation information 23 to the transmission device.

Next, operation of the communication device of the first exemplary embodiment will be described with reference to drawings. Below, although a case that two kinds of modulation systems are switched adaptively as an example, this exemplary embodiment is applicable to a case that no smaller than three kinds of modulation systems are switched adaptively.

As shown in FIG. 3 and FIG. 4, in this exemplary embodiment, the modulation system which is requested to be applied to the transmission device using the modulation system designation information 23 is judged corresponding to the reception level. And the hysteresis control is introduced in switching of the modulation system. That is, two levels of the first modulation system switching threshold and the second modulation system switching threshold are set as the modulation system switching threshold. Values of the first modulation system switching threshold and the second modulation system switching threshold are the modulation system switching threshold I and the modulation system switching threshold II respectively, and the modulation system switching threshold II is larger than the modulation system switching threshold I.

The judgment of the modulation system to be applied next is performed as follows like the hysteresis control based on FIG. 22. That is, in case the reception level is less than the modulation system switching threshold I, the judgment result of the modulation system to be applied next will always be the modulation system I. In case the reception level is no smaller than the modulation system switching threshold II, the judgment result of the modulation system to be applied next will always be the modulation system II. However, in case the reception level is no smaller than the modulation system switching threshold I and is less than the modulation system switching threshold II, depending on which of the modulation system I or the modulation system II the current modulation system is, the judgment result of the modulation system to be applied next is different. That is, in case the reception level is within the range mentioned above, if the current modulation system is the modulation system I, the modulation system applied next is also I, and if the current modulation system is the modulation system II, the modulation system applied next is II.

Further, when the communication device requests the transmission device to apply a certain modulation system, it will be performed by transmitting the modulation system designation information 23 mentioned above to the transmission device.

Next, the hysteresis width which is a feature of this exemplary embodiment will be described. The difference between the modulation system switching threshold I and the modulation system switching threshold II, that is, the hysteresis width, is equal to the transmission power variation width which is the variation of the transmission power at the time of switching of the modulation system. This hysteresis width is called hereinafter as "a first hysteresis width". Further, in the correspondence table of FIG. 3, "the modulation system switching threshold" is abbreviated simply as "the switching threshold".

A setting method of the first hysteresis width in this exemplary embodiment will be described. First, it is necessary that the first hysteresis width is no smaller than the variation width of the transmission power accompanying the switching of the modulation system, that is, the transmission power variation width. Accordingly, the first hysteresis width may be equal to the transmission power variation width. Also, the first hysteresis width may be larger than the transmission power variation width. However, it is necessary to pay attention that, when the first hysteresis width is made larger than necessary, it may hinder original switching of the modulation system which should be performed corresponding to the variation of the reception level as the adaptive modulation.

In order to set the first hysteresis width, it is necessary that the value of the transmission power variation width is known. In order for that, the transmission power variation width may be acquired from the transmission device in advance and set to the designation information output unit 14.

By the way, a maximum value of the transmission power may be set to the modulation system I and II respectively as described above. The maximum value of the transmission power of the respective modulation systems will be called hereinafter "a maximum transmission power I" and "a maximum transmission power II". Here, it is supposed that the maximum transmission power I is larger than the maximum transmission power II. Under such condition, a case that the modulation system is switched from the modulation system I to the modulation system II is considered. The transmission power will be no more than the maximum transmission power II after switching to the modulation system II. Therefore, a case that the transmission power variation width becomes maximum is the case that the transmission power I is transmitted with the maximum transmission power I before the switching of the modulation system. Accordingly, the first hysteresis width can be set to a value equal to the difference between the maximum transmission power I and the maximum transmission power II or a value no smaller than the difference.

Or, the transmission power information which indicates the transmission power when the external transmission device transmits the received signal 20 may be included in the received signal 20 from the external transmission device. In this case, as shown in FIG. 2, transmission power information 24 is extracted from the received data 21 using the information extracting unit 13. And the transmission power variation width is obtained based on the modulation system control information 22 and the transmission power information 24. That is, switching of the modulation system is detected based on the modulation system control information 22, and the variation width of the transmission power is detected based on the transmission power information 24. Since the transmission power information 24 corresponds to the modulation system control information 22, variation of the transmission power accompanying the change of the modulation system, that is, the transmission power variation width, can be obtained.

Next, with reference to FIG. 5, FIG. 6, FIG. 7 and FIG. 8, an example of operation of the communication device of the first exemplary embodiment will be described specifically with reference to the drawings.

It is supposed that the state of the transmission line is stable. That is, it is supposed that the modulated signal transmitted from the opposite station is attenuated for a certain fixed amount and reaches the local station.

Figure 5:
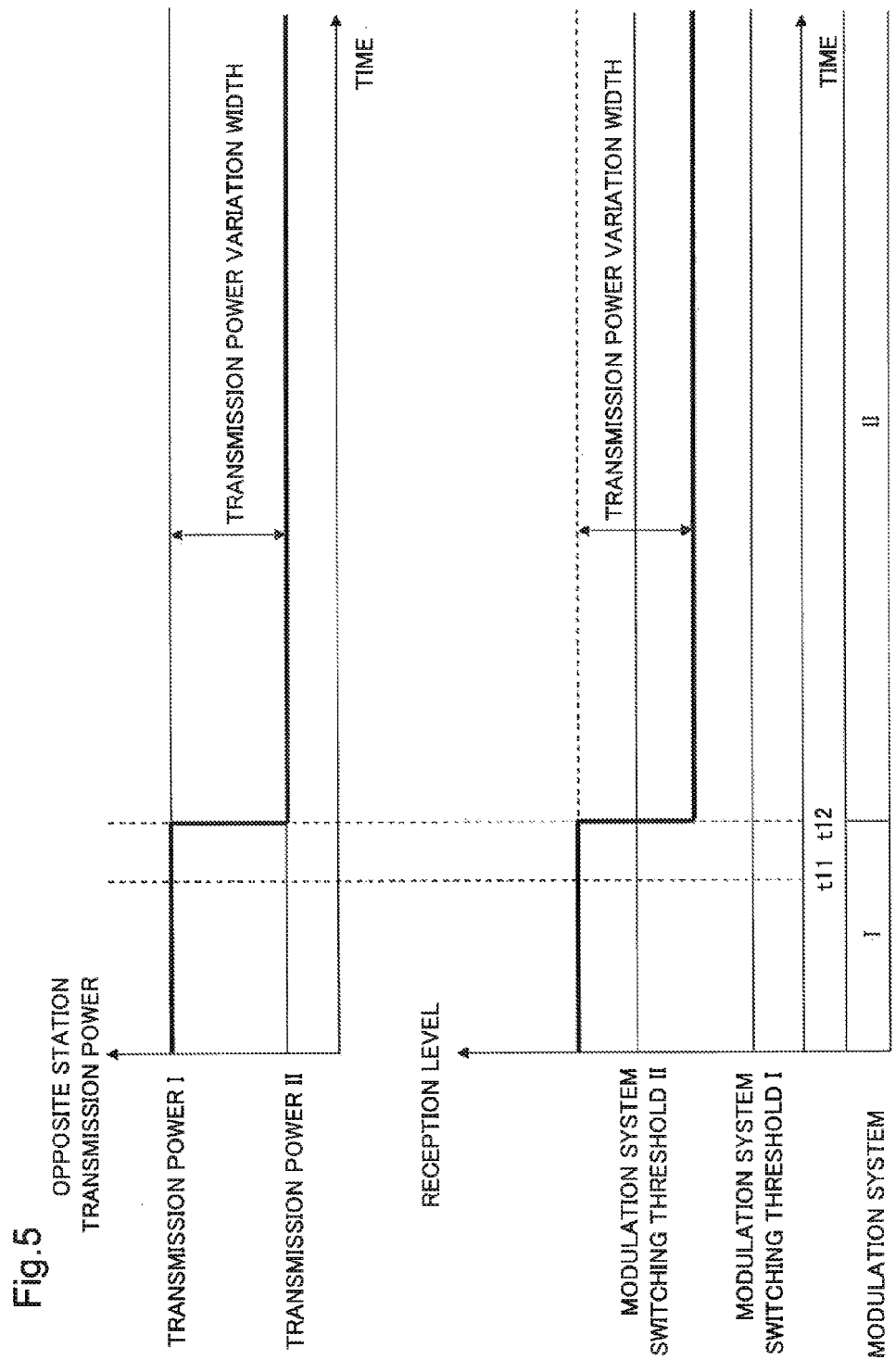
[FIG. 5] is a graph showing an example of operation of an adaptive modulation system of the first exemplary embodiment of the present invention.

First, a case that the reception level is higher than the modulation system switching threshold II will be described with reference to FIG. 5. In the initial state, it is supposed that the modulation system I is applied as the modulation system. In the initial state, since the reception level is higher than the modulation system switching threshold II, after the predetermined waiting time has passed (time t11), the local station requests the opposite station to change the modulation system to the modulation system II. When the communication device requests increase or decrease of the transmission power to the transmission device, it is performed by transmitting the transmission power designation information mentioned above to the transmission device.

Further, the waiting time in this exemplary embodiment is arbitrary. When the waiting time is short, responsiveness of the change of the modulation system gets better, and when the waiting time is long, the responsiveness of the change of the modulation system becomes worse. In any case, regardless of the length of the waiting time, the above-mentioned problem caused by the switching of the modulation system does not occur.

The opposite station which received the request changes the modulation system to the modulation system II (time t12). And the opposite station lowers the transmission power to the transmission power II.

When the opposite station lowers the transmission power to the transmission power II, the reception level of the local station also declines. However, since the modulation system switching threshold I is lower than the modulation system switching threshold II by the transmission power variation width, the reception level will never become less than the modulation system switching threshold I. Therefore, the reception level will be no smaller than the modulation system switching threshold I and less than the modulation system switching threshold II. Accordingly, switching of the modulation system is not requested to the opposite station from the local station.

When the reception level of the initial state is different from as mentioned above, and even in case it is equal to the modulation system switching threshold II, or in case it is lower than the modulation system switching threshold II, this exemplary embodiment can be applied.

Figure 6:
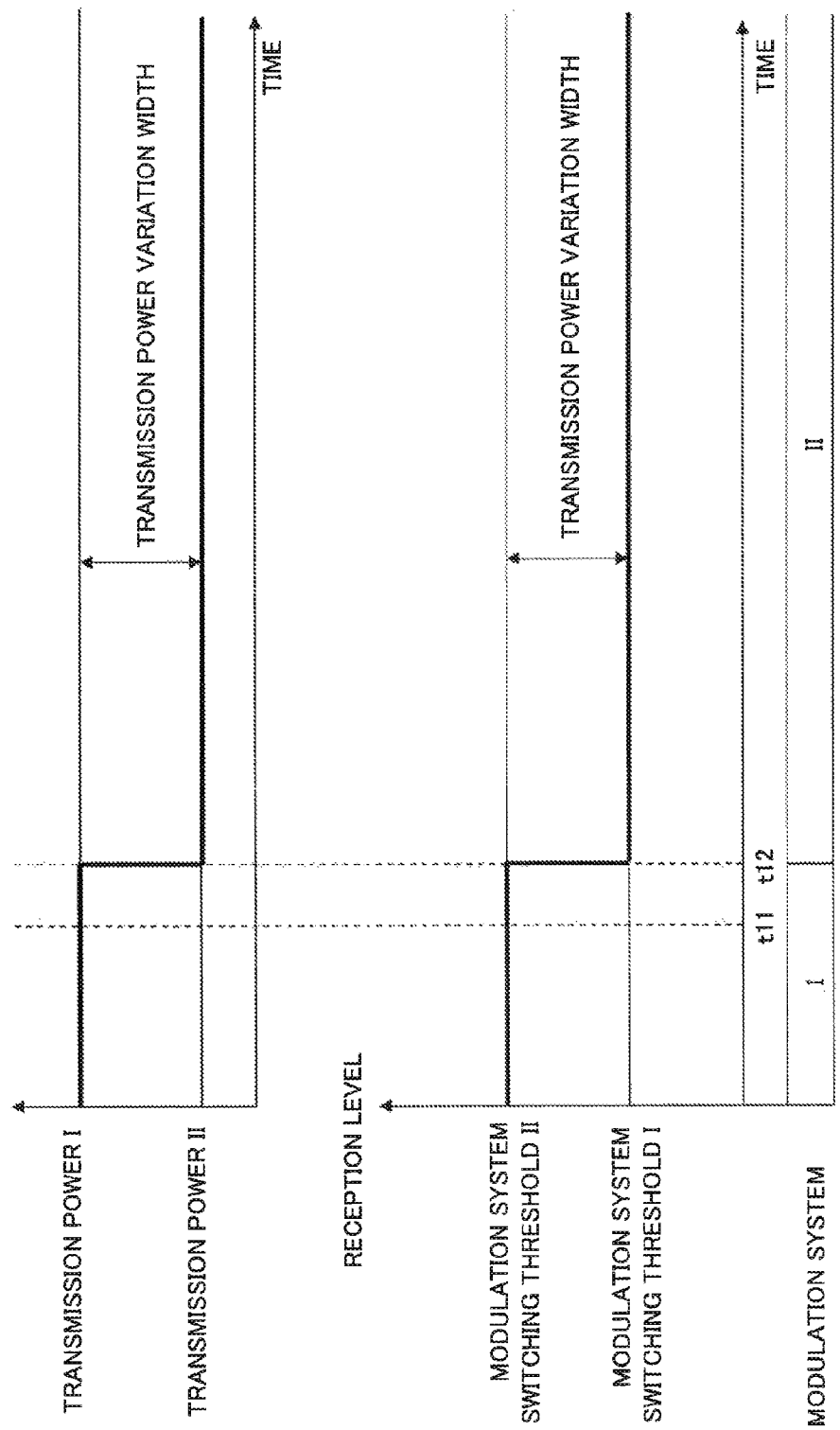
[FIG. 6] is a graph showing an example of operation of an adaptive modulation system of the first exemplary embodiment of the present invention.

Next, a case that the reception level is equal to the modulation system switching threshold II will be described with reference to FIG. 6. In the initial state, since the reception level is equal to the modulation system switching threshold II, after the waiting time has passed (time t11), the local station requests the opposite station to change the modulation system to the modulation system II.

The opposite station which received the request changes the modulation system to the modulation system II (time t12). And the opposite station lowers the transmission power to the transmission power II.

When the opposite station lowers the transmission power to the transmission power II, the reception level of the local station also declines. However, since the modulation system switching threshold I is lower than the modulation system switching threshold II by the transmission power variation width, the reception level becomes equal to the modulation system switching threshold I and does not become less than the modulation system switching threshold I. Therefore, the reception level will be no smaller than the modulation system switching threshold I and less than the modulation system switching threshold II. Accordingly, switching of the modulation system is not requested to the opposite station from the local station.

Figure 7:
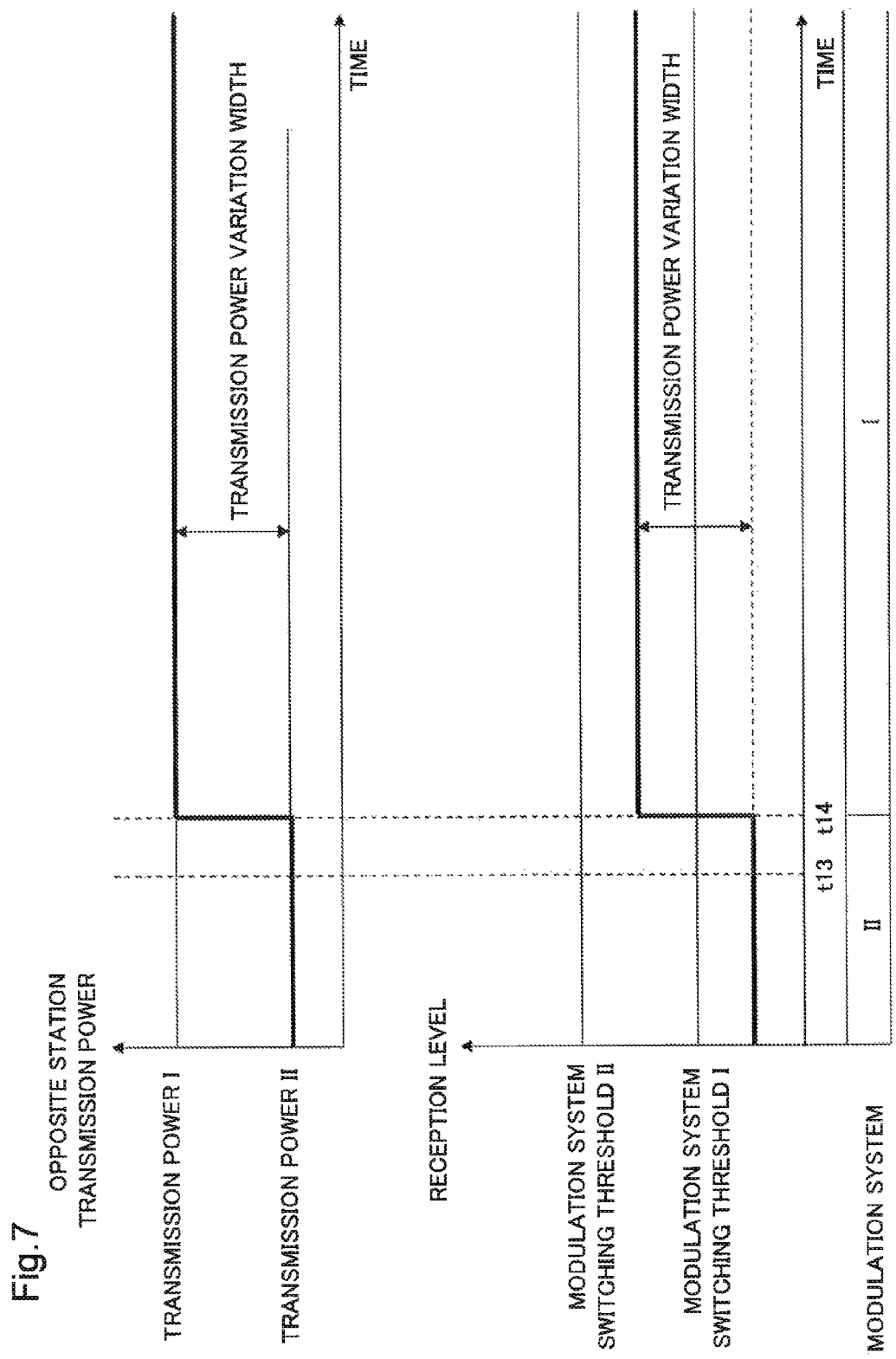
[FIG. 7] is a graph showing an example of operation of an adaptive modulation system of the first exemplary embodiment of the present invention.

Next, a case that the reception level is lower than the modulation system switching threshold I will be described with reference to FIG. 7. In the initial state, it is supposed that the modulation system II is applied as the modulation system. In the initial state, since the reception level is lower than the modulation system switching threshold I, after the waiting time has passed (time t13), the local station requests the opposite station to change the modulation system to the modulation system I.

The opposite station which received the request changes the modulation system to the modulation system I (time t14). And the opposite station raises the transmission power to the transmission power I.

When the opposite station raises the transmission power to the transmission power I, the reception level of the local station also rises. However, since the modulation system switching threshold II is higher than the modulation system switching threshold I by the transmission power variation width, the reception level will never be no smaller than the modulation system switching threshold II. Therefore, the reception level will be no smaller than modulation system switching threshold I and less than the modulation system switching threshold II. Accordingly, switching of the modulation system is not requested to the opposite station from the local station.

Figure 8:
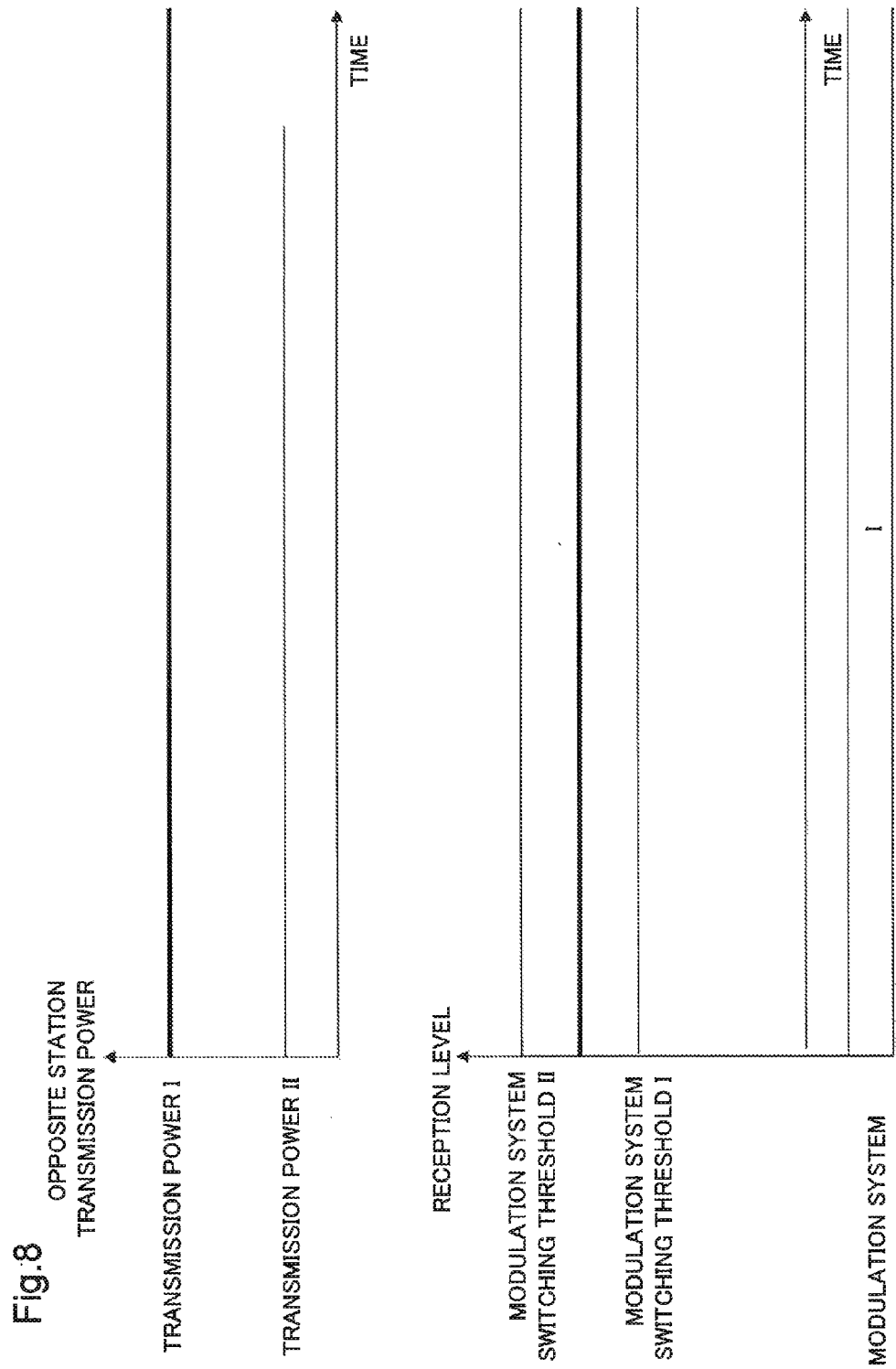
[FIG. 8] is a graph showing an example of operation of an adaptive modulation system of the first exemplary embodiment of the present invention.

Further, as shown in FIG. 8, in case the reception level of the initial state is no smaller than the modulation system switching threshold I and less than the modulation system switching threshold II, request of switching of the modulation system to the opposite station from the local station will never occur.

As described above, in the communication device of the first exemplary embodiment, corresponding to the variation of the transmission power accompanying the switching of the modulation system, the modulation system switching threshold I is set to a value lower than the modulation system switching threshold II by the transmission power variation width. Therefore, there are no cases that the reception level will become less than the modulation system switching threshold I or become no smaller than the modulation system switching threshold II again after switching of the modulation system. Accordingly, there is the effect that the switching of the modulation system becomes stable.

Further, specific modulation system of the modulation system I and II are not limited in particular. For example, there is a method to decide the modulation system I and II in an ascending order of a reception level, a carrier to noise ratio and so on which are necessary to satisfy the communication performance required for a communication device such as communication speed, throughput and BER. Specifically, the modulation system I and II may be set based on the reception level necessary for each of them to secure the predetermined communication performance. The modulation systems I and II may be set based on the carrier to noise ratio necessary for each of them to secure the predetermined communication performance. The modulation systems I and II may be set in ascending order of their transmission rates. Or, the modulation systems I and II may be set to the same method (for example, such as quadrature amplitude modulation) with the multi-valued number in ascending order (such as 4 valued, 8 valued and 16 valued). However, this exemplary embodiment is effective when the transmission power declines if the modulation system I is switched to the modulation system II, and conversely, when the transmission power rises if the modulation system II is switched to the modulation system I.

Also, in the description mentioned above, it was supposed that the modulation system is judged and selected from two kinds, that is, I and II. A number of choices of the modulation system should be plural, but the number is not limited in particular. That is, the modulation system may be judged among no smaller than three kinds and selected. However, the switching control method of the modulation system of this exemplary embodiment is effective in case the transmission power varies as described above before and after the switching of the modulation system.

Further, the received signal 20 should be a signal for which the modulation system and the transmission power are controllable. Accordingly, a medium on which the received signal 20 is transmitted may be wireless or wired. Also, as for the transmission signal 30, a medium on which the transmission signal 30 is transmitted may be wireless or wired.

(The Second Exemplary Embodiment)

As described above, there is a case that, in order to handle fluctuation of the state of the transmission line, the hysteresis control is introduced into the adaptive modulation system. A communication device of the second exemplary embodiment is one which applied the present invention to the adaptive modulation system which performs the hysteresis control to handle fluctuation of the state of the transmission line.

Figure 9:
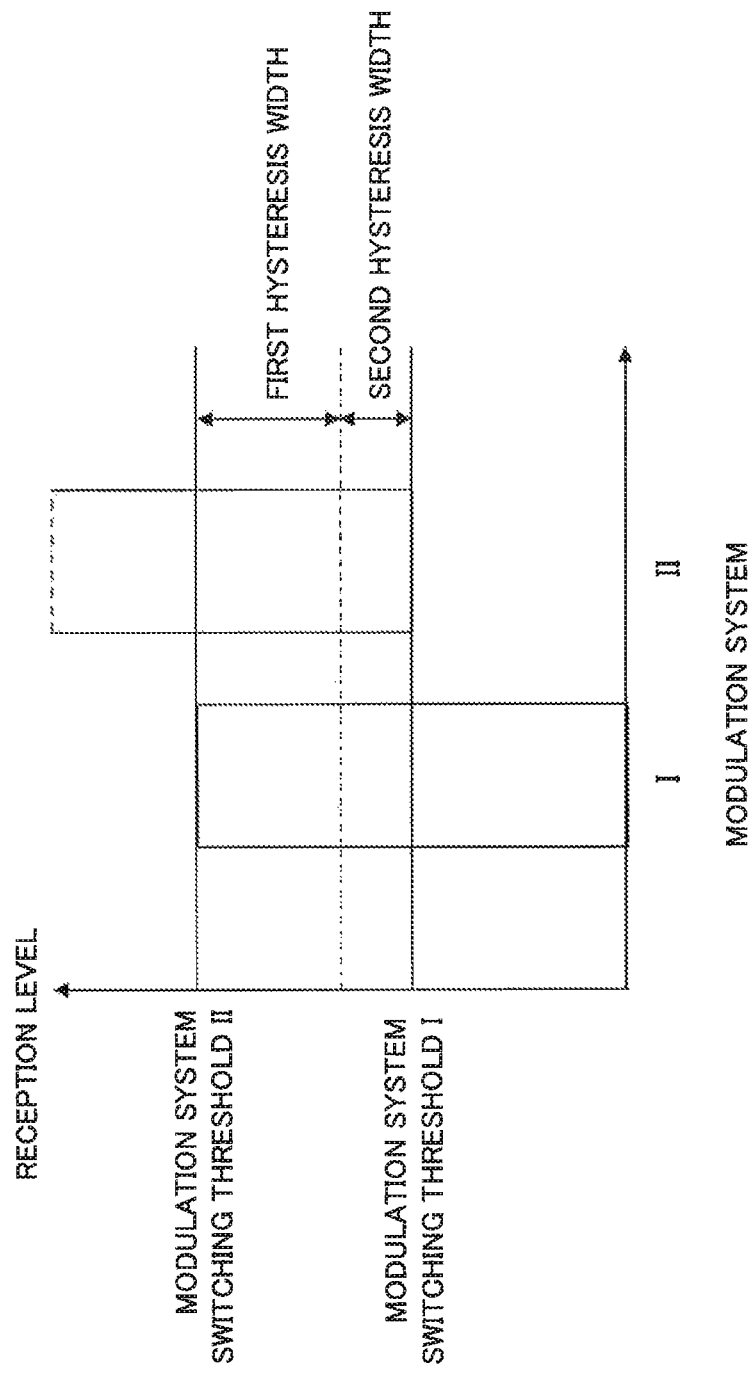
[FIG. 9] is a graph showing correspondence of a reception level and a modulation system in an adaptive modulation system of the second exemplary embodiment of the present invention.
Figure 10:
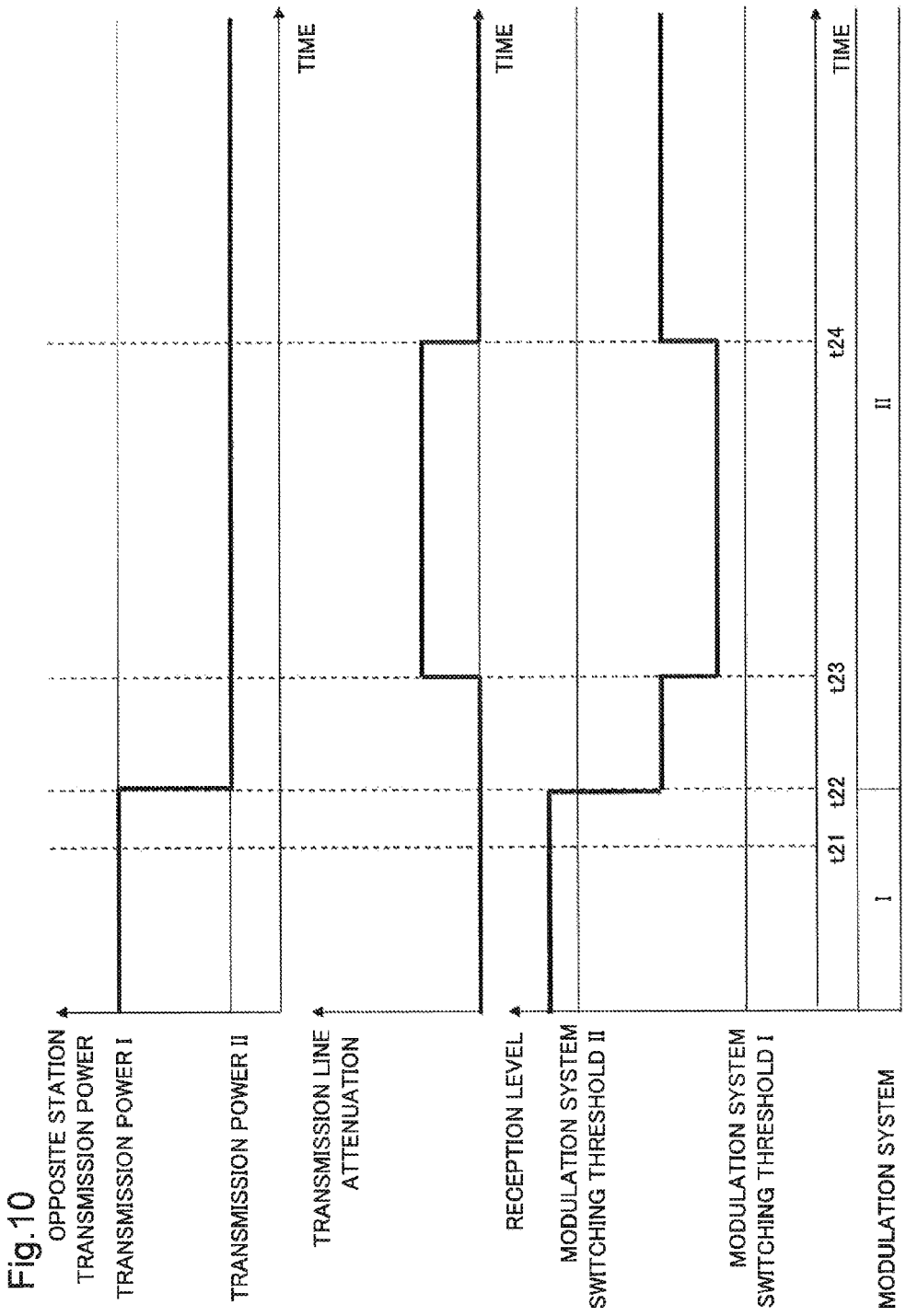
[FIG. 10] is a graph showing an example of operation of an adaptive modulation system of the second exemplary embodiment of the present invention.

FIG. 9 is a graph showing correspondence of the reception level and the modulation system in the adaptive modulation control of the second exemplary embodiment. FIG. 10 is a graph showing the reception level change with time and variation of the modulation system applied and the transmission power of the transmission device when the adaptive modulation control is performed in the second exemplary embodiment.

The communication device of the second exemplary embodiment includes the same structure as the communication device of the first exemplary embodiment shown in FIG. 1. Therefore, the description will be omitted. However, in the communication device of the second exemplary embodiment and the communication device of the first exemplary embodiment, the hysteresis width to be set is different. Below, the difference between the communication device of the second exemplary embodiment and the communication device of the first exemplary embodiment will be described in detail.

As mentioned above, the communication device of the second exemplary embodiment performs the hysteresis control in order to handle fluctuation of the state of the transmission line. The hysteresis width in the hysteresis control to handle fluctuation of the state of the transmission line is called "a second hysteresis width". The second hysteresis width and the hysteresis width in the first exemplary embodiment (the first hysteresis width) are different in the object of the setting. That is, the second hysteresis width is set in order to absorb the fluctuation of the state of the transmission line. Accordingly, the second hysteresis width is set so that the fluctuation of the reception level no more than that may be ignored. On the other hand, the first hysteresis width is equal to the variation width of the transmission power (transmission power variation width) before and after the switching of the modulation system.

And the hysteresis width in the second exemplary embodiment (hereinafter, referred to as "a third hysteresis width") is equal to a sum of the first hysteresis width and the second hysteresis width.

With reference to FIG. 10, an example of operation when the communication device of the second exemplary embodiment performs the hysteresis control with the third hysteresis width will be described specifically with reference to the drawing.

In the second exemplary embodiment, the state of the transmission line varies. Specifically, attenuation of a signal in the transmission line increases during a certain period (from time t23 to t24). It is supposed that the increase of the attenuation of this time is smaller than the second hysteresis width. That is, although the modulated signal transmitted from the opposite station will be attenuated for a certain amount in the transmission line, the attenuation of the amount smaller than the second hysteresis width is added from time t23 to t24, and it reaches the local station.

In the initial state, it is supposed that the modulation system I is applied as the modulation system. In the initial state, since the reception level is higher than the modulation system switching threshold II, after the waiting time has passed (time t21), the local station requests the opposite station to change the modulation system to the modulation system II. When the communication device requests increase or decrease of the transmission power to the transmission device, it is performed by transmitting the transmission power designation information mentioned above to the transmission device.

The waiting time is arbitrary also in this exemplary embodiment. When the waiting time is short, responsiveness of the change of the modulation system gets better, and when the waiting time is long, the responsiveness of the change of the modulation system becomes worse. In any case, regardless of the length of the waiting time, the above-mentioned problem caused by the switching of the modulation system does not occur. Further, in order to ignore the fluctuation of the transmission line attenuation during a short time, the waiting time may be set no smaller than the fluctuation period of the transmission line attenuation which should be ignored.

The opposite station which received the request changes the modulation system to the modulation system II (time t22). And the opposite station lowers the transmission power to the transmission power II.

When the opposite station lowers the transmission power to the transmission power II, the reception level of the local station also declines. However, since the modulation system switching threshold I is lower than the modulation system switching threshold II by no smaller than the transmission power variation width, the reception level does not become less than the modulation system switching threshold I. Therefore, the reception level will be no smaller than the modulation system switching threshold I and less than the modulation system switching threshold II. Accordingly, switching of the modulation system is not requested to the opposite station from the local station.

Since during a period from time t23 to t24 the transmission line attenuation increases, the reception level declines further. However, the third hysteresis width is equal to the sum of the first hysteresis width and the second hysteresis width. Therefore, the modulation system switching threshold I is lower than the modulation system switching threshold II by no smaller than the sum of the transmission power variation width and the attenuation of the transmission line. Accordingly, since the reception level does not become less than the modulation system switching threshold I, the reception level remains to be no smaller than the modulation system switching threshold I and less than the modulation system switching threshold II. Therefore, switching of the modulation system is not requested to the opposite station from the local station.

Further, as can be understood from the description above, the third hysteresis width may be no smaller than the sum of the first hysteresis width and the second hysteresis width. However, the larger the third hysteresis width is, the less the switching of the modulation system becomes to occur. That is, there is a possibility that, even under the condition that the reception level varies and originally the modulation system should be switched, the switching may not occur. Accordingly, the most desirable third hysteresis width is a value equal to the sum of the first hysteresis width and the second hysteresis width.

As described above, the third hysteresis width is set to a value equal to the sum of the first hysteresis width and the second hysteresis width in the communication device of the second exemplary embodiment. Therefore, even if switching of the modulation system and the fluctuation of the state of the transmission line occur combined, there are no cases that the reception level will become less than the modulation system switching threshold I or become no smaller than the modulation system switching threshold II again. Accordingly, it has the effect that the switching of the modulation system becomes stable.

(The Third Exemplary Embodiment)

Next, an exemplary embodiment which assumes a specific device will be described. The third exemplary embodiment is an example of a communication system including two wireless communication devices. According to the third exemplary embodiment, the hysteresis control is performed to handle the fluctuation of the state of the transmission line.

Figure 11:
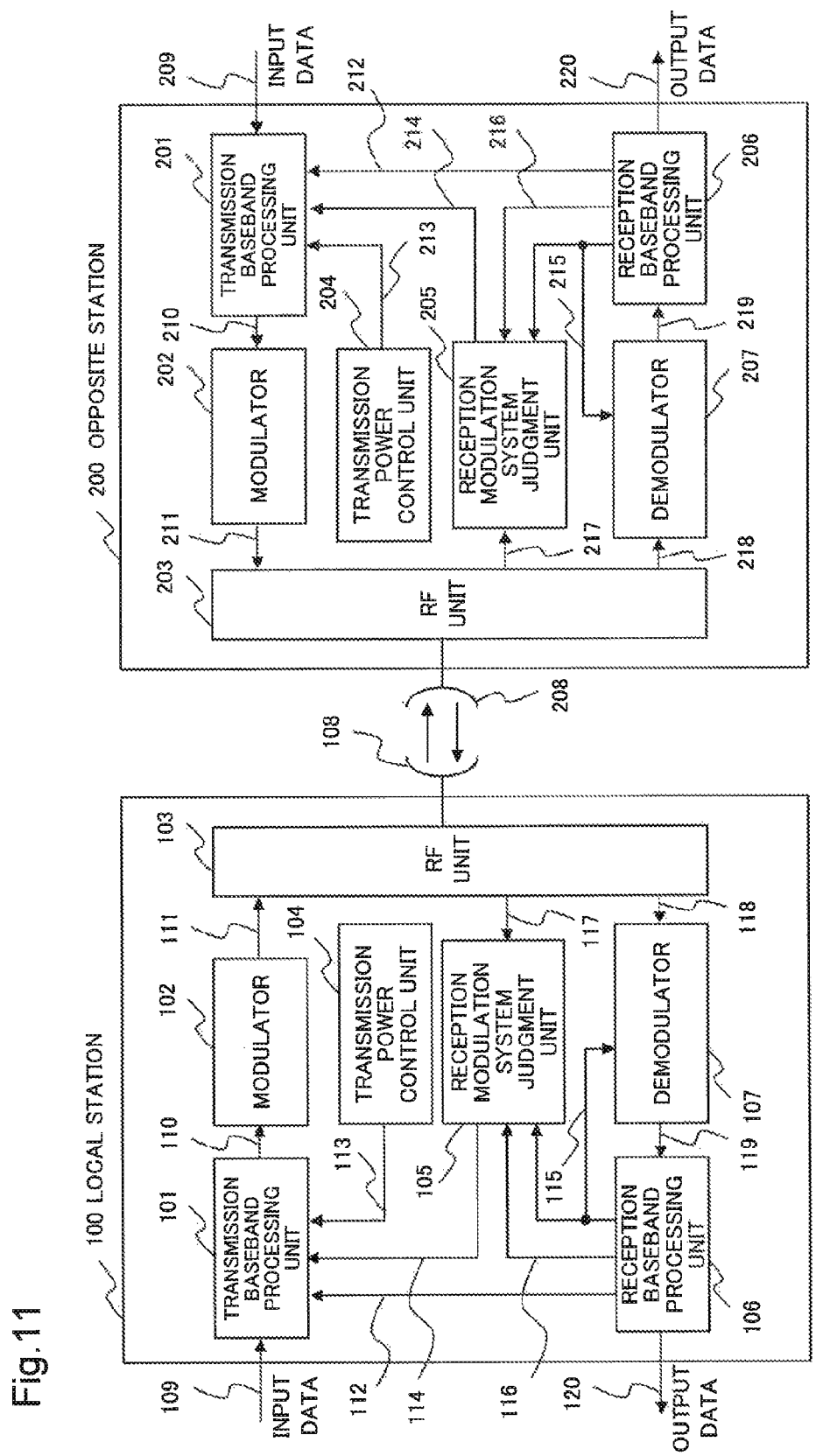
[FIG. 11] is a block diagram showing a structure of a communication system of the third exemplary embodiment of the present invention.

A structure of the communication system of the third exemplary embodiment is shown in FIG. 11. A wireless communication system of the third exemplary embodiment includes a wireless communication device 100 and a wireless communication device 200. Since the wireless communication device 100 and the wireless communication device 200 have the identical structure, only the configuration of the wireless communication device 100 will be described below.

The wireless communication device 100 includes a transmission baseband processing unit 101, a modulator 102, an RF (Radio Frequency) unit 103 and a transmission power control unit 104. Further, the wireless communication device 100 includes a reception modulation system judgment unit 105, a reception baseband processing unit 106, a demodulator 107 and an antenna 108.

Figure 12:
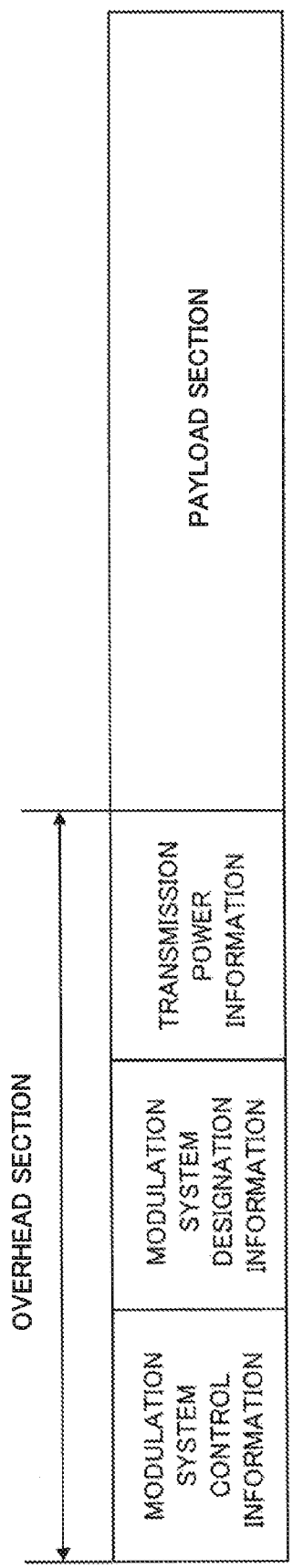
[FIG. 12] is a format diagram showing an example of a structure of a wireless frame transmitted and received by a wireless communication device of the third exemplary embodiment of the present invention.

The transmission baseband processing unit 101 multiplexes an input data 109 and various control information such as modulation system control information 112 and modulation system designation information 114 in a wireless frame shown in FIG. 12. After that, the transmission baseband processing unit 101 outputs the multiplexed information to the modulator 102 as a transmission wireless frame data 110.

Transmission power information 113 is information which designates the transmission power set by the RF unit 103, that is, the transmission power of the wireless communication device 100, and is set by the transmission power control unit 104 described below. The transmission power of the wireless communication device 100 varies depending on the modulation system. The transmission power information 113 is not only outputted to the RF unit 103, but is multiplexed to the transmission wireless frame data 110 as shown in FIG. 12 and transmitted also to the wireless communication device 200 finally.

Further, the transmission power of the wireless communication device 100 may vary based on directions from the wireless communication device 200.

The modulator 102 modulates the transmission wireless frame data 110 inputted from the transmission baseband processing unit 101 according to the modulation system control information 112 stored in an overhead section of the transmission wireless frame data one frame before. And outputs the modulated signal as a transmission IF (Intermediate Frequency: intermediate frequency) signal 111 to the RF unit 103.

The transmission power control unit 104 outputs the transmission power information 113 to the transmission baseband processing unit 101.

The RF unit 103 performs, for the transmission IF signal 111 inputted, frequency conversion to a prescribed wireless frequency. And the RF unit 103 transmits the wireless signal for which frequency conversion is performed to the wireless communication device 200 through the antenna 108.

Also, the RF unit 103 includes an automatic gain control function and a frequency conversion function for a received wireless signal. The RF unit 103 receives the wireless signal transmitted by the wireless communication device 200 through the antenna 108. And the RF unit 103 performs level control and frequency conversion for the received wireless signal, and outputs it to the demodulator 107 as a received IF signal 118.

The automatic gain control function of the RF unit 103 will be described further in detail. The RF unit 103 keeps the level of the received IF signal 118 at a prescribed value and also estimates the level of the received signal using control information when the automatic gain control is performed. And the RF unit 103 outputs the estimated level of the received signal to the reception modulation system judgment unit 105 as reception level information 117.

The demodulator 107 performs demodulation processing according to reception modulation system control information 115 inputted from the reception baseband processing unit 106 for the received IF signal 118. And the demodulator 107 outputs the received IF signal 118 for which demodulation processing is performed to the reception baseband processing unit 106 as a received wireless frame data 119.

As mentioned above, the antenna 108 transmits the wireless signal from the RF unit 103 to the wireless communication device 200, receives the wireless signal from the wireless communication device 200 and outputs it to the RF unit 103.

The reception modulation system judgment unit 105 generates the modulation system designation information 114 based on the reception modulation system control information 115 and opposite station transmission power information 116 inputted from the reception baseband processing unit 106, and the reception level information 117 inputted from the RF unit. The modulation system designation information 114 is transmitted to the wireless communication device 200, and designates the modulation system which should be applied by the wireless communication device 200.

Figure 13:
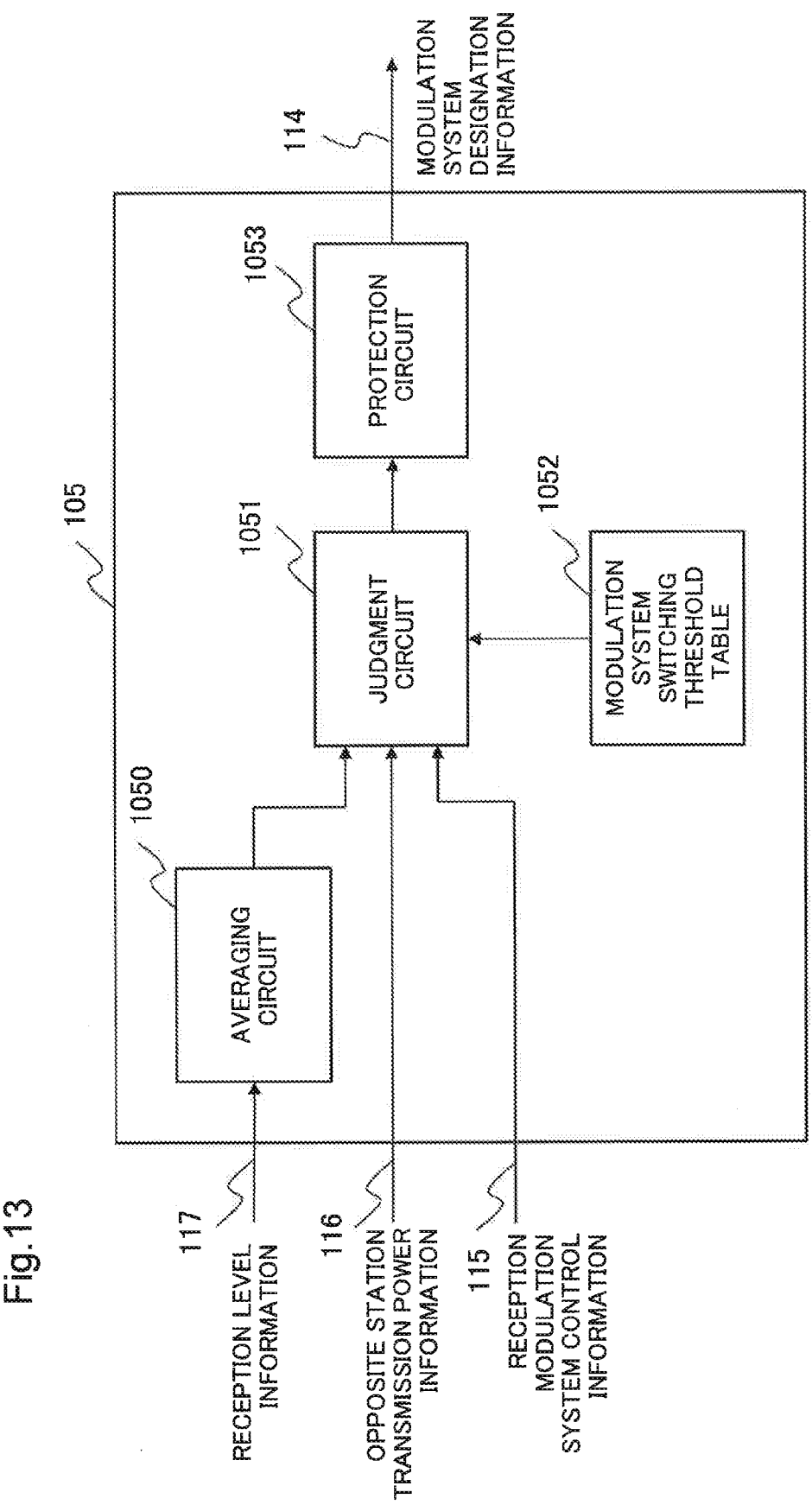
[FIG. 13] is a block diagram showing an example of a structure of a reception modulation system judgment unit of a wireless communication device of the third exemplary embodiment of the present invention.

FIG. 13 is a block diagram showing an example of an exemplary embodiment of the reception modulation system judgment unit 105. An averaging circuit 1050 averages a plurality of the reception level information 117 during a fixed period inputted from the RF unit 103, and outputs the average reception level which is a mean value to a judgment circuit 1051. A modulation system switching threshold table 1052 outputs an upper limit threshold and a lower limit threshold of the reception level of each modulation system (hereinafter, simply referred to as "an upper limit threshold" and "a lower limit threshold") to the judgment circuit 1051. The difference between the upper limit threshold and the lower limit threshold here, that is, a hysteresis width, is the hysteresis width which is set so that the modulation system will not switch affected by the influence of fluctuation of the state of the transmission line, that is, "the second hysteresis width" in the second exemplary embodiment.

The judgment circuit 1051 obtains increase/decrease and the variation width of the transmission power of the opposite station accompanying the switching of the modulation system based on the reception modulation system control information 115 and the opposite station transmission power information 116 inputted from the reception baseband processing unit 106. And it operates either or both of the inputted upper limit threshold and the lower limit threshold. At this time, amount that the upper limit threshold and/or the lower limit threshold are operated corresponds to "the first hysteresis width" in the first exemplary embodiment. And the difference between the operated upper limit threshold and the lower limit threshold corresponds to "the third hysteresis width" in the second exemplary embodiment. In this exemplary embodiment, hereinafter, an expression such as the first hysteresis width, the second hysteresis width and the third hysteresis width is used.

For example, in case the transmission power of the opposite station declines accompanying the switching of the modulation system, the lower limit threshold may be lowered by only the same amount as the variation width. Or, the upper limit threshold may be raised in advance by only the same amount as the variation width. In case the transmission power of the opposite station rises accompanying the switching of the modulation system, the upper limit threshold may be raised by only the same amount as the variation width. Or, the lower limit threshold may be lowered by only the same amount as the variation width.

Figure 14:
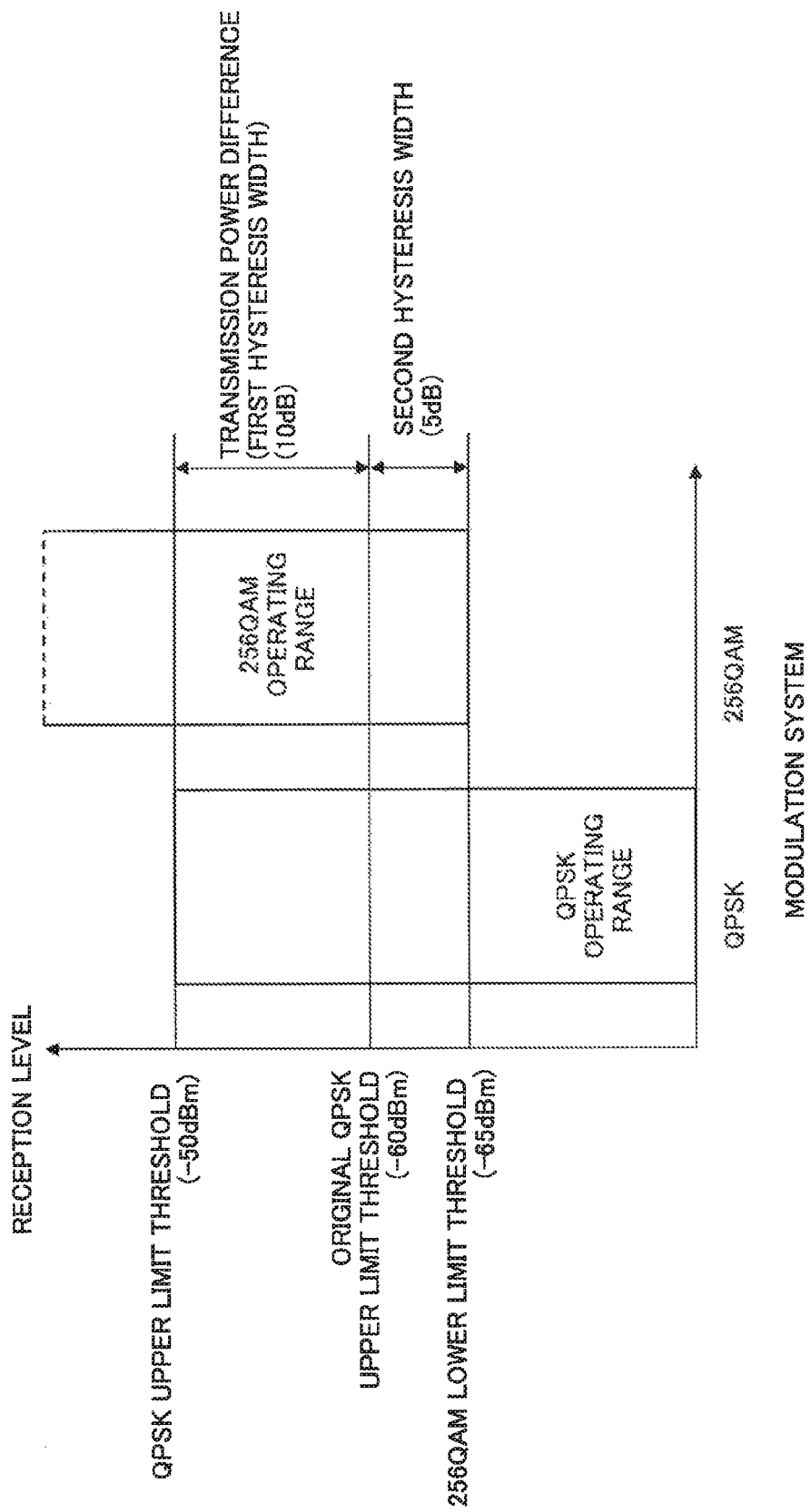
[FIG. 14] is a graph showing an example of correspondence of a reception level and a modulation system in an adaptive modulation system of the third exemplary embodiment of the present invention.

FIG. 14 shows a specific example of an operation of the upper limit threshold in a graph showing correspondence of the reception level and the modulation system. In the example of FIG. 14, as the modulation system, two kinds, that is, QPSK and 256QAM can be selected. And an initial value of a QPSK upper limit threshold which is a threshold for switching to 256QAM from QPSK when the reception level rises and exceeds it, is −60 dBm. A 256QAM lower limit threshold which is a threshold for switching from 256QAM to QPSK when the reception level declines and become less than it, is −65 dBm. Here, it is supposed that the transmission power declines by only 10 dB when the modulation system is switched to 256QAM from QPSK. On the contrary, when the modulation system is switched from 256QAM to QPSK, it is supposed that the transmission power rises by only 10 dB. In this case, the QPSK upper limit threshold is raised by only 10 dB and is changed to −50 dBm.

And the judgment circuit 1051 compares, based on the reception modulation system control information 115, the average reception level inputted from the averaging circuit 1050, and the upper limit threshold and the lower limit threshold of the reception level of each of the modulation systems operated as mentioned above. And the judgment circuit 1051 judges the most suitable modulation system and outputs the result to a protection circuit 1053. The protection circuit 1053 confirms that the modulation system judgment result inputted from the judgment circuit 1051 becomes the same result successively for a number of times set in advance and makes it the final confirmation result. And outputs the confirmation result as the modulation system designation information 114 to the transmission baseband processing unit 101.

The protection circuits 1053 will be described further. When the same judgment result is obtained successively for the number of times set in advance, the protection circuit 1053 determines the judgment result as the next modulation system suited for the present propagation line state. And the protection circuit 1053 outputs the modulation system of the determination result to the transmission baseband processing unit 101 as the modulation system designation information 114. Thus, averaging processing is performed to the inputted reception level information 117, modulation system judgment is performed using the averaging result, and a predetermined period of protection is provided to the judgment result. By providing the period of protection, it is possible to prevent switching of the modulation system being repeated reacting to a sudden variation of the propagation line state.

The reception baseband processing unit 106 extracts modulation system designation information 214 of the wireless communication device 200 from the received wireless frame data 119. The modulation system designation information 214 was generated in a reception modulation system judgment unit 205, and was multiplexed to a transmission wireless frame data 210. The transmission wireless frame data 210 of the wireless communication device 200 corresponds to the received wireless frame data 119 of the wireless communication device 100. The reception baseband processing unit 106 outputs the extracted modulation system designation information 214 to the transmission baseband processing unit 101 as the modulation system control information 112.

Also, the reception baseband processing unit 106 extracts the modulation system control information from the received wireless frame data 119 and outputs it to the reception modulation system judgment unit 105 and the demodulator 107 as the reception modulation system control information 115.

And the reception baseband processing unit 106 outputs a payload data multiplexed in the received wireless frame data 119 as an output data 120.

The structure and the function of each component of the wireless communication device 100 described above are also common to the wireless communication device 200. In FIG. 11, a most significant digit of codes which are attached to each component of the wireless communication device 100 and signals used inside the wireless communication device 100 is unified to "1". As for the wireless communication device 200, the most significant digit of codes which are attached to each component of the wireless communication device 100 and signals used is changed to "2" and the same digits are used for all the other places. For example, an antenna of the wireless communication device 200 corresponding to the antenna 108 of the wireless communication device 100 is indicated as an antenna 208.

Further, the operating method of the upper limit threshold or the lower limit threshold by the judgment circuit 1051 is not limited to the method mentioned above. That is, even though it is an operating method of the upper limit threshold or the lower limit threshold other than that mentioned above, as far as it can make the difference between the upper limit threshold and the lower limit threshold larger than the variation of the reception level accompanying the switching of the modulation system, it is permissible.

Using the wireless frame format shown in FIG. 12, a mechanism of modulation system switching from the transmission baseband processing unit 101 of the local station to a reception baseband processing unit 206 of the opposite station will be described. The transmission wireless frame data 110 is a wireless frame shown in FIG. 12 succeeding over time. In order to perform modulation system switching hitless, that is without interruption, the modulation system switching is performed in units of the wireless frame. Accordingly, the modulation system of a certain wireless frame is indicated by the modulation system control information included in the overhead section one frame before. This is because it is necessary in a demodulator 207 of the opposite station to know timing of the modulation system switching in advance. In the opposite station, which system the modulation system applied to a certain received wireless frame is can be known for the first time when a received IF signal 218 is demodulated in the demodulator 207. However, in order to demodulate the received IF signal 218 and obtain the right received wireless frame data, it is necessary to know the modulation system in advance. Therefore, the modulation system control information may be made to express the modulation system of the next wireless frame, not the modulation system of the wireless frame including itself.

Next, operation of the modulation system judgment and the transmission power control of the system as a whole performed based on the function and the operation of each unit mentioned above will be described using FIG. 15. In this exemplary embodiment, it is supposed that the upper limit threshold and the lower limit threshold are set as shown in FIG. 14. In the following explanation, for convenience sake, the wireless communication device 100 is called "the local station", and the wireless communication device 200 "the opposite station". As shown in FIG. 11, the local station and the opposite station have the identical structure. And the modulation system judgment and the transmission power control are performed, in each of the direction from the local station to the opposite station and the direction from the opposite station to the local station, by the identical operation and independently. By performing the identical operation, the local station and the opposite station are transmitting and receiving each other. Below, the modulation system and the transmission power control in the direction from the opposite station to the local station will be described as an example. Therefore, below, only the operation of the local station will be described.

FIG. 14 represented a QPSK upper limit threshold and a 256QAM lower limit threshold for the modulation system switching in each modulation system. Also, FIG. 15 represents variations over the time of: the reception level of the local station, the attenuation of the propagation line and the transmission power of the opposite station; and the modulation system judged on the local station side according to that.

Even in the third exemplary embodiment, the state of the transmission line varies. Specifically, from time t33 to t34, the attenuation of the signal in the transmission line increases. It is supposed that the increase amount of the attenuation at this time is smaller than the second hysteresis width. That is, although the signal transmitted from the opposite station is attenuated by a certain amount in the transmission line, from time t33 to t34, the attenuation with the amount smaller than the second hysteresis width is added, and it reaches the local station.

Figure 15:
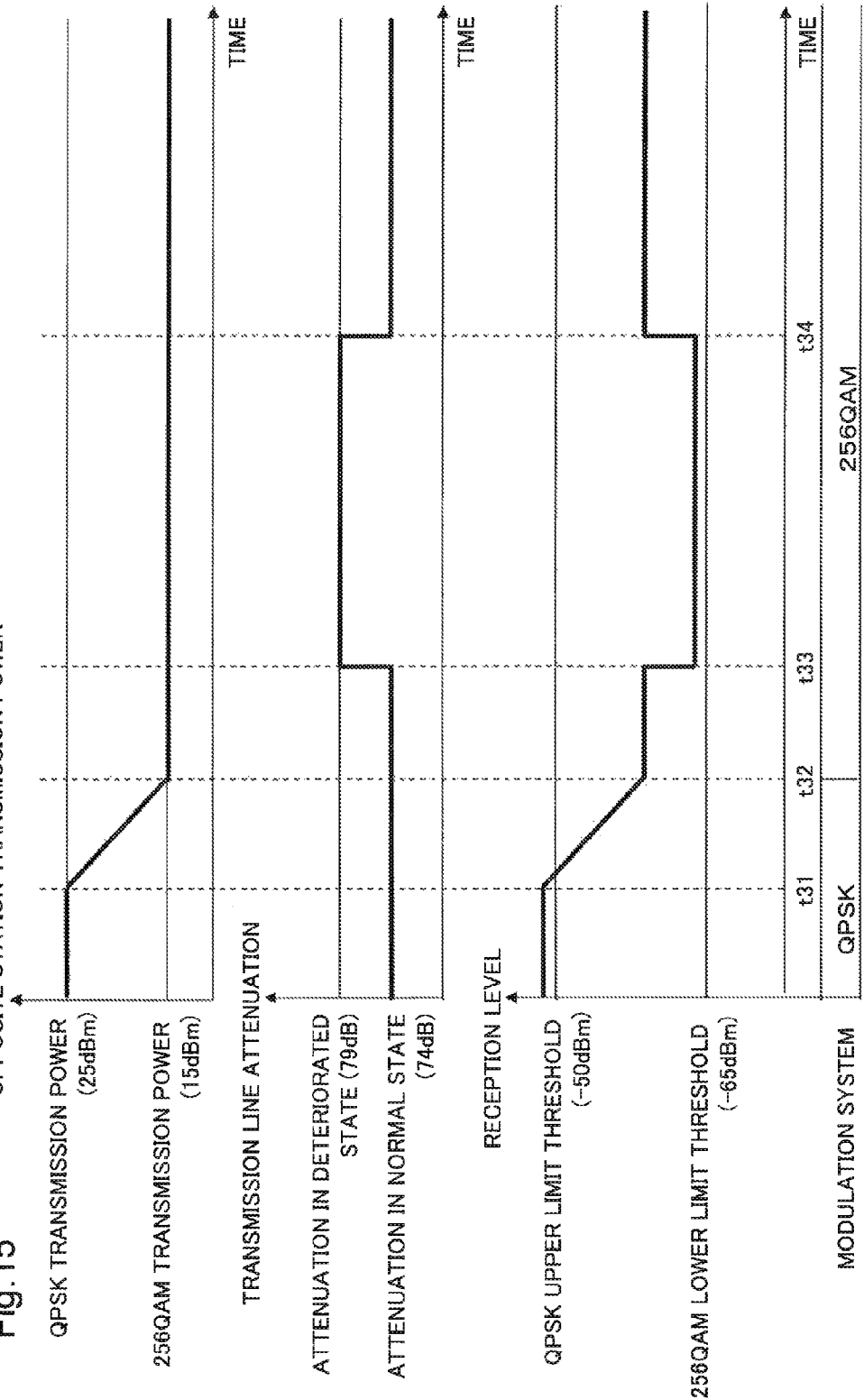
[FIG. 15] is a graph showing operation of an adaptive modulation system in an adaptive modulation system of the third exemplary embodiment of the present invention.

In FIG. 15, it is supposed that the transmission power of the opposite station when 256QAM is applied is 15 dBm, and the transmission power when QPSK is applied is 25 dBm. In the initial state, QPSK is applied in the opposite station, and the transmission power is 25 dBm. The attenuation of the propagation line is 74 dB, and the reception level of the local station is −49 dBm.

In the initial state, since the reception level is higher than the QPSK upper limit threshold, after the waiting time has passed (time t31), the local station requests the opposite station to change the modulation system to 256QAM. When the communication device requests increase or decrease of the transmission power to the transmission device, it is performed by transmitting the transmission power designation information 114 mentioned above to the transmission device.

The waiting time is arbitrary also in this exemplary embodiment. When the waiting time is short, responsiveness of the change of the modulation system gets better, and when the waiting time is long, the responsiveness of the change of the modulation system becomes worse. In any case, regardless of the length of the waiting time, the above-mentioned problem caused by the switching of the modulation system does not occur. Further, in order to ignore the fluctuation of the transmission line attenuation during a short time, the waiting time may be set no smaller than the fluctuation period of the transmission line attenuation which should be ignored.

In order to change the modulation system to 256QAM, the opposite station which received the request starts to lower the transmission power. And when the transmission power declines to the transmission power 15 dBm of 256QAM (time t32), the opposite station changes the modulation system to 256QAM. Further, although in the first and the second exemplary embodiment time necessary to lower the transmission power was ignored, considering a practical aspect, the transmission power is made to vary gradually over a predetermined time in this exemplary embodiment.

When the opposite station lowers the transmission power to 15 dBm, the reception level of the local station also declines to −59 dBm. However, since the 256QAM lower limit threshold is lower than the QPSK upper limit threshold by no smaller than the variation width of the transmission power, the reception level does not become less than the 256QAM lower limit threshold. That is, the reception level is no smaller than the 256QAM lower limit threshold and less than the QPSK upper limit threshold. Therefore, switching of the modulation system is not requested to the opposite station from the local station.

At time t33, since the transmission line attenuation increases to 79 dB, the reception level will further decline and becomes −64 dBm. However, the third hysteresis width is equal to the sum of the first hysteresis width and the second hysteresis width. Therefore, the 256QAM lower limit threshold is lower than the QPSK upper limit threshold by no smaller than the sum of the transmission power variation width and the attenuation of the transmission line. Accordingly, since the reception level does not become less than the 256QAM lower limit threshold, the reception level remains to be no smaller than the 256QAM lower limit threshold and less than the QPSK upper limit threshold. Therefore, switching of the modulation system is not requested to the opposite station from the local station.

Further, as can be understood from the description above, the third hysteresis width may be no smaller than the sum of the first hysteresis width and the second hysteresis width. However, the larger the third hysteresis width is, the less the switching of the modulation system becomes to occur. That is, there is a possibility that, even under the condition that the reception level varies and originally the modulation system should be switched, the switching may not occur. Accordingly, the most desirable third hysteresis width is a value equal to the sum of the first hysteresis width and the second hysteresis width.

Further, in the communication system of this exemplary embodiment, in case the transmission power does not vary according to the modulation system, the first hysteresis width is made zero.

Figure 16:
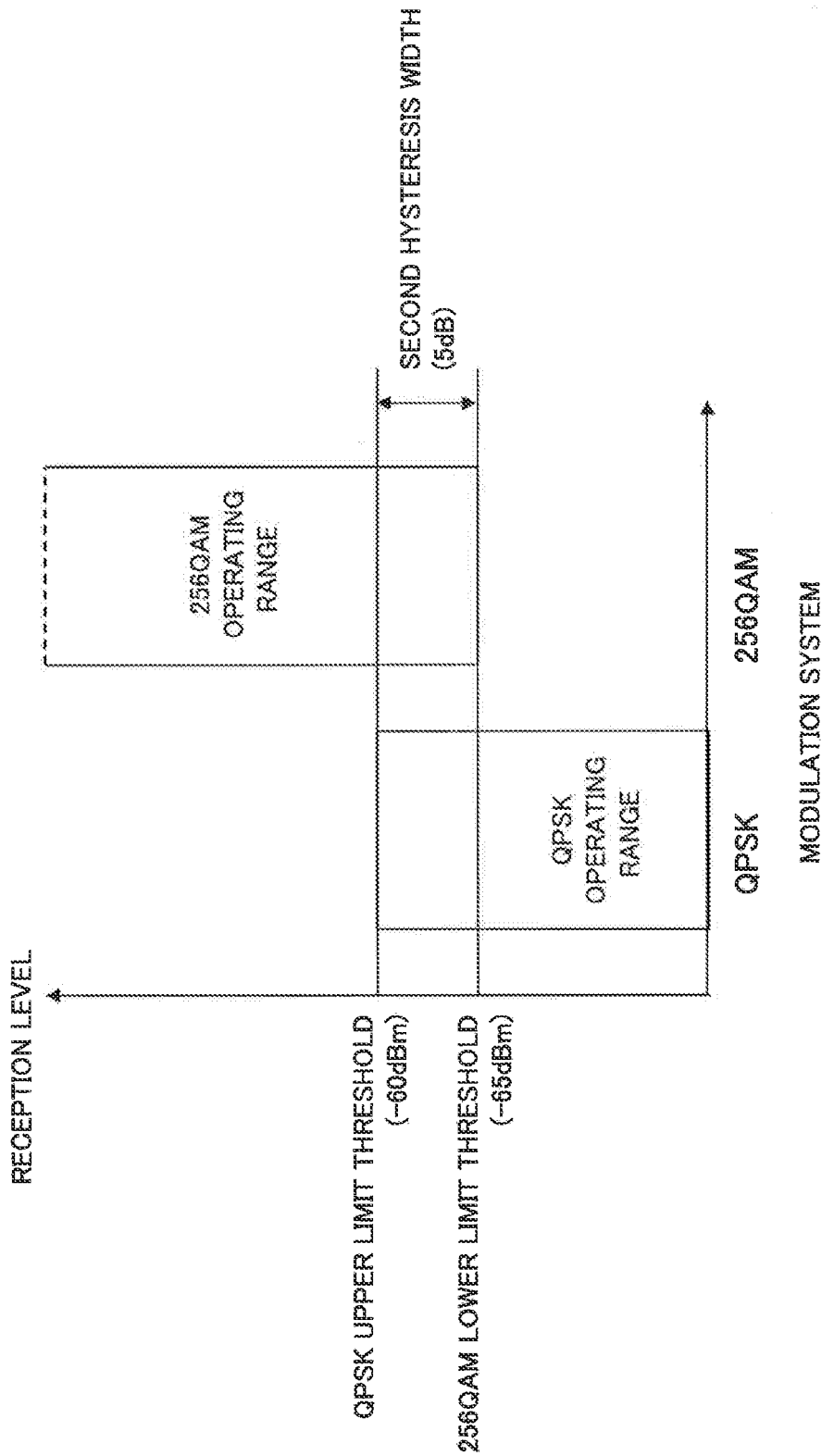
[FIG. 16] is a graph showing another example of correspondence of a reception level and a modulation system in an adaptive modulation system of the third exemplary embodiment of the present invention.

FIG. 16 indicates the QPSK upper limit threshold and the 256QAM lower limit threshold for the modulation system switching in each modulation system when the first hysteresis width is made zero. When the first hysteresis width is made zero, only the hysteresis control to ignore the fluctuation of the transmission line by the second hysteresis width is performed.

Figure 17:
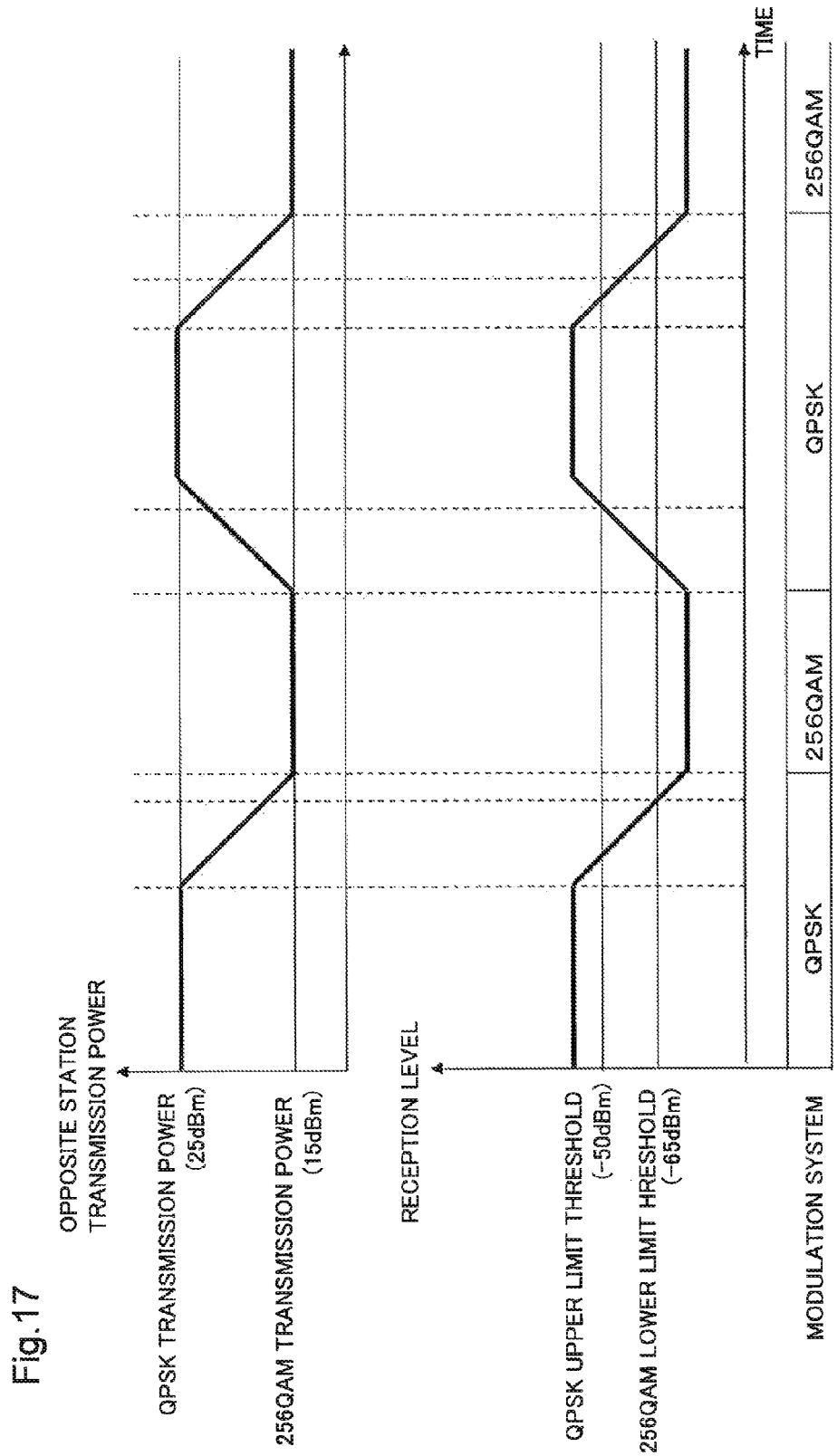
[FIG. 17] is a graph showing operation when hysteresis control handling variation in transmission power accompanying switching of a modulation system is not performed in a communication system of the third exemplary embodiment of the present invention.

As a reference, an example of operation when only the second hysteresis width is set and the first hysteresis width is made zero, and when the transmission power varies accompanying the switching of the modulation system is described in FIG. 17. FIG. 17 represents variation over the time of: the reception level of the local station, the attenuation of the propagation line and the transmission power of the opposite station; and the modulation system judged on the local station side according to that.

Thus, when the second hysteresis width (5 dB) is smaller than the variation width of the transmission power (10 dB), it will be known that switching occurs again when the modulation system switches, and the system does not become stable. In case the transmission power varies accompanying the switching of the modulation system, as mentioned above, by setting the first hysteresis width, occurrence of the problem that switching of the modulation system succeeds can be prevented.

Further, the processing of the reception modulation system judgment unit 105 in the third exemplary embodiment may be performed using a computer built in the wireless communication device 100 and software.

Figure 18:
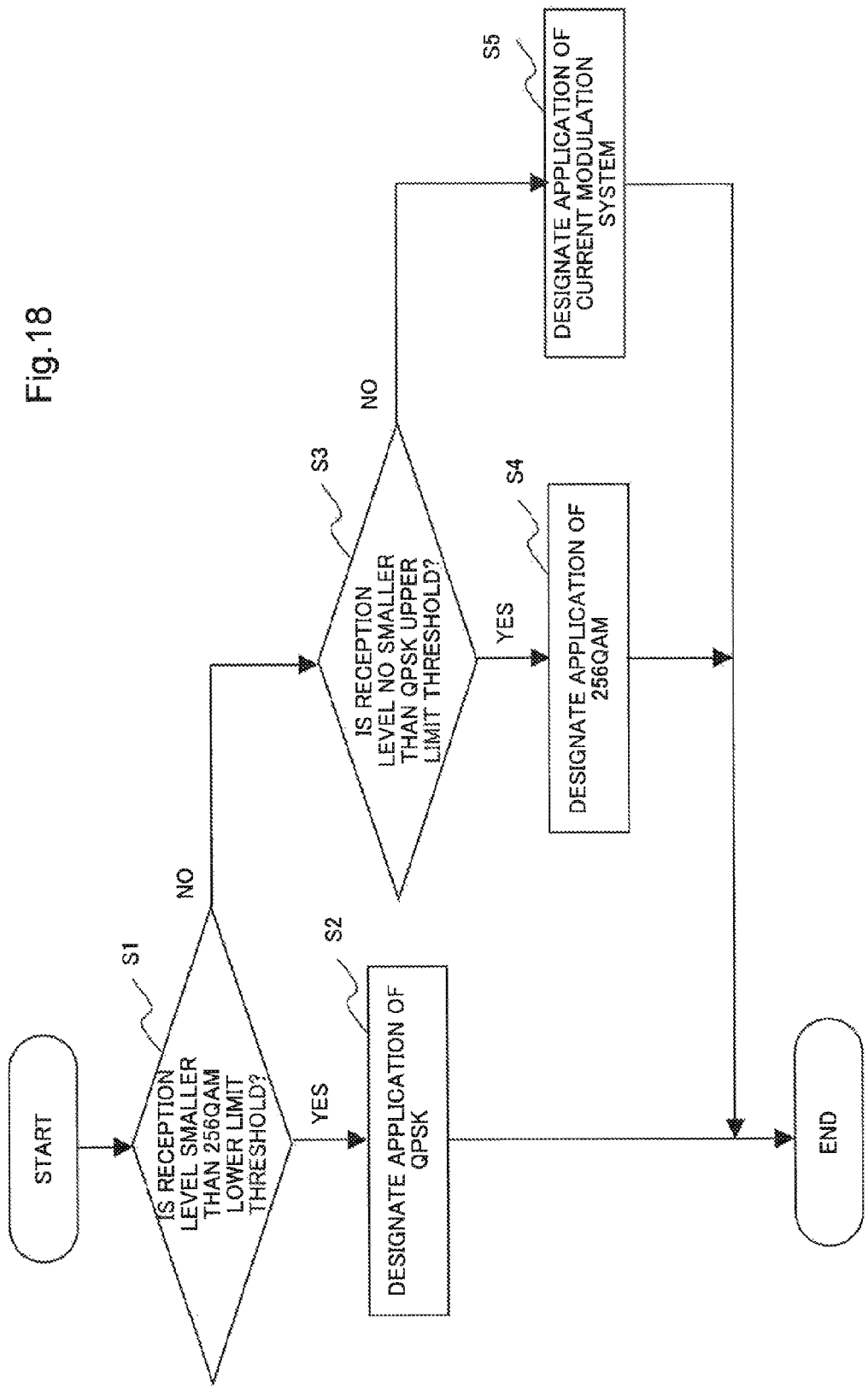
[FIG. 18] is an example of a flowchart when processing of a reception modulation system judgment unit of a wireless communication device of the third exemplary embodiment of the present invention is performed using software.

An example of a flow chart when the processing of the reception modulation system judgment unit 105 is performed using software is shown in FIG. 18.

The flow chart of FIG. 18 will be described. The computer in the reception modulation system judgment unit 105 judges the reception level at the moment and selects the modulation system based on the judgment result.

First, the reception modulation system judgment unit 105 compares the present reception level with the 256QAM lower limit threshold (Step S1). When the present reception level is smaller than the 256QAM lower limit threshold, the reception modulation system judgment unit 105 outputs the modulation system designation information which designates application of QPSK (Step S2).

In Step S1, when the present reception level is no smaller than the 256QAM lower limit threshold, the reception modulation system judgment unit 105 compares the present reception level with the QPSK upper limit threshold (Step S3). In Step S3, when the present reception level is no smaller than the QPSK upper limit threshold, the reception modulation system judgment unit 105 outputs the modulation system designation information which designates application of 256QAM (Step S4).

In Step S3, when the present reception level is less than the QPSK upper limit threshold, the reception level is no smaller than the 256QAM lower limit threshold and less than the QPSK upper limit threshold. Accordingly, the reception modulation system judgment unit 105 outputs the modulation system designation information so that the present modulation system may be applied just as it is (Step S5). And henceforth, processing from Steps S1 to S5 is repeated.

The software which performs the control mentioned above can be stored in a computer-readable appropriate storage medium.

As described above, in the communication device of the third exemplary embodiment, corresponding to the variation of the transmission power accompanying the switching of the modulation system, the third hysteresis width is set to a value equal to the sum of the first hysteresis width and the second hysteresis width. Therefore, even if switching of the modulation system and the fluctuation of the state of the transmission line occur combined, there are no cases that the reception level will become less than the 256QAM lower limit threshold or become no smaller than the QPSK upper limit threshold again. Accordingly, it has the effect that the switching of the modulation system becomes stable.

Further, the method of the transmission power control relates to the control inside the transmission device. Accordingly, the modulation system control method of this exemplary embodiment is not dependent on a specific method of the transmission power control applied in the transmission device. That is, even if the method and the transmission power value of the transmission power control in the transmission device are changed during the operation of the transmission device, by applying the modulation system control method of this exemplary embodiment, the most suitable upper limit/lower limit threshold can always be set.

Further, the exemplary embodiment mentioned above can be combined with other exemplary embodiments respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-067922 filed on Mar. 24, 2010, the disclosure of which is incorporated herein in its entirety by reference.

INDUSTRIAL APPLICABILITY

The present invention relates to a communication device, a communication system and a communication control method and in particular relates to a communication device, a communication system and a communication control method capable of stable switching of a modulation system and has industrial applicability.

REFERENCE SIGNS LIST

10 Communication device
20 Received signal
21 Received data
22 Modulation system control information
23 Modulation system designation information
24 Transmission power information
30 Transmission signal
100, 200 Wireless communication device
108, 208 Antenna
110, 210 Transmission wireless frame data
111, 211 Transmission IF signal
112, 212 Modulation system control information
113, 213 Transmission power information
114, 214 Modulation system designation information
115, 215 Reception modulation system control information
116, 216 Opposite station transmission power information
117, 217 Reception level information
118, 218 Received IF signal
119, 219 Received wireless frame data

The invention claimed is:

1. A communication device comprising:
a receiving unit which receives a signal modulated according to a modulation system including a first modulation system and a second modulation system by an external transmission device based on modulation system designation information, demodulates said received signal based on modulation system control information, and outputs a received data;
a reception level measurement unit which measures a signal level of the received signal, and outputs a reception level;
an information extracting unit which outputs said modulation system control information based on said received data;
a designation information output unit which outputs said modulation system designation information according to a modulation system switching threshold which was set based on a transmission power variation width which is a variation width when transmission power at a time when said signal is transmitted by said transmission device varies before and after switching of said modulation system between said first modulation system and said second modulation system by said transmission device; and
a transmission unit which transmits said modulation system designation information to said transmission device,
wherein said modulation system switching threshold includes a first modulation system switching threshold and a second modulation system switching threshold which have a threshold difference no smaller than said transmission power variation width, and said designation information output unit outputs said modulation system designation information which requests application of said first modulation system when said reception level is below the first modulation system switching threshold, requests application of said second modulation system when said reception level is no smaller than the second modulation system switching threshold, and requests keeping of application of said modulation system when said reception level is no smaller than said first modulation system threshold and less than said second modulation system switching threshold.

2. The communication device according to claim 1, wherein said threshold difference is equal to said transmission power variation width.

3. The communication device according to claim 1, wherein said threshold difference is no smaller than a sum of an attenuation variation width which is a permissible variation width of said reception level for preventing occurrence of said switching by fluctuation of attenuation of said signal in a transmission line to said transmission device and said transmission power variation width.

4. The communication device according to claim 3, wherein said threshold difference is equal to the sum of said attenuation variation width and said transmission power variation width.

5. The communication device according to claim 1, wherein said threshold difference is no smaller than a transmission power difference which is a difference between a first maximum transmission power which is the transmission power when said transmission device transmits said signal by said first modulation system, and a second maximum transmission power which is the transmission power when said transmission device transmits said signal by said second modulation system.

6. The communication device according to claim 5, wherein said threshold difference is equal to said transmission power difference.

7. The communication device according to claim 5, wherein said threshold difference is no smaller than the sum of the attenuation variation width which is a permissible variation width of said reception level for preventing occurrence of said switching by fluctuation of attenuation of said signal in the transmission line to said transmission device and said maximum transmission power difference.

8. The communication device according to claim 5, wherein said threshold difference is equal to the sum of said attenuation variation width and said transmission power difference.

9. The communication device according to claim 1, wherein said designation information output unit controls said threshold difference based on transmission power information about said transmission power received from said transmission device.

10. A communication system comprising:
a first communication device which performs modulation according to a modulation system capable of switching and transmits a signal; and
a second communication device which requests said switching to said first communication device according to a modulation system switching threshold which was set based on a transmission power variation width which is a variation width when transmission power at a time when said signal is transmitted by said first communication device varies accompanying said switching,
wherein the first communication device performs said modulation according to said modulation system including a first modulation system and a second modulation system based on modulation system designation, and transmits said signal, and wherein the second communication device comprises:
a receiving unit which receives said signal, demodulates said received signal based on modulation system control information, and outputs a received data;
a reception level measurement unit which measures a signal level of the received signal and outputs said reception level;
an information extracting unit which outputs said modulation system control information based on said received data;
a designation information output unit which, according to said modulation system switching threshold which was set based on said transmission power variation width before and after switching of said modulation system between said first modulation system and said second modulation system by said first communication device, outputs said modulation system designation information; and
a transmission unit which transmits said modulation system designation information to said first communication device,
wherein said modulation system switching threshold includes a first modulation system switching threshold and a second modulation system switching threshold which have a threshold difference no smaller than said transmission power variation width, and said designation information output unit outputs said modulation system designation information which requests application of said first modulation system when said reception level is below the first modulation system switching threshold, requests application of said second modulation system when said reception level is no smaller than the second modulation system switching threshold, and requests keeping of application of said modulation system when said reception level is no smaller than said first modulation system threshold and less than said second modulation system switching threshold.

11. The communication system according to claim 10, wherein said first communication device transmits transmission power information about said transmission power included in said signal;
said information extracting unit outputs said transmission power information based on said received data; and
said designation information output unit controls a threshold difference which is a difference between said first modulation system switching threshold and said second modulation system switching threshold based on said transmission power information.

12. A communication control method comprising the steps of:
switching a modulation system adaptively and transmitting a signal;
setting a threshold for switching said modulation system based on a variation width of transmission power of said signal varying accompanying the switching of said modulation system;
deciding said modulation system when transmitting said signal based on said threshold; and
requesting, according to a modulation system switching threshold which was set based on a transmission power variation width which is a variation width of transmission power accompanying switching of a modulation system on a transmission side, switching of the modulation system to said transmission side, wherein said modulation system includes a first modulation system and a second modulation system;
said transmission power variation width is a variation width when the transmission power in said transmission side varies before and after switching of said modulation system by said transmission side between said first modulation system and said second modulation system; and
said method further comprises:
receiving a signal for which modulation is performed based on modulation system designation information on said transmission side;
demodulating said received signal based on modulation system control information, and outputting a received data;
measuring a signal level of said received signal, and outputting a reception level;
outputting said modulation system control information based on said received data; and
transmitting said modulation system designation information to said transmission device,
wherein:
said modulation system switching threshold includes a first modulation system switching threshold and a second modulation system switching threshold which have a threshold difference no smaller than said transmission power variation width; and
said method further comprising:
when said reception level is less than said first modulation system switching threshold, outputting the modulation system designation information which requests application of said first modulation system;
when said reception level is no smaller than said second modulation system switching threshold, outputting said modulation system designation information which requests application of said second modulation system; and
when said reception level is no smaller than said first modulation system switching threshold and less than said second modulation system switching threshold, outputting said modulation system designation information which requests keeping of application of said modulation system.

13. A communication device comprising:
a receiving means which receives a signal modulated according to a modulation system including a first modulation system and a second modulation system by an external transmission device based on modulation system designation information, demodulates said received signal based on modulation system control information, and outputs a received data;
a reception level measurement means which measures a signal level of said received signal, and outputs a reception level;
an information extracting means which outputs said modulation system control information based on said received data;
a designation information output means which outputs said modulation system designation information according to a modulation system switching threshold which was set based on a transmission power variation width which is a variation width when transmission power at a time when said signal is transmitted by said transmission device varies before and after switching of said modulation system between said first modulation system and said second modulation system by said transmission device; and
a transmission means which transmits said modulation system designation information to said transmission device,
wherein said modulation system switching threshold includes a first modulation system switching threshold and a second modulation system switching threshold which have a threshold difference no smaller than said transmission power variation width, and
said designation information output means outputs said modulation system designation information which requests application of said first modulation system when said reception level is below the first modulation system switching threshold, requests application of said second modulation system when said reception level is no smaller than the second modulation system switching threshold, and requests keeping of application of said modulation system when said reception level is no smaller than said first modulation system switching threshold and less than said second modulation system switching threshold.

* * * * *